(12) United States Patent
Yamamoto

(10) Patent No.: US 7,318,060 B2
(45) Date of Patent: Jan. 8, 2008

(54) DOCUMENT MANAGEMENT DEVICE AND METHOD, PROGRAM THEREFOR, AND STORAGE MEDIUM

(75) Inventor: Yohei Yamamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 676 days.

(21) Appl. No.: 10/765,850

(22) Filed: Jan. 29, 2004

(65) Prior Publication Data
US 2004/0255241 A1 Dec. 16, 2004

(30) Foreign Application Priority Data
Jan. 30, 2003 (JP) ............................. 2003-022143
Jan. 19, 2004 (JP) ............................. 2004-011067

(51) Int. Cl.
*G06F 7/00* (2006.01)

(52) U.S. Cl. ............................................. 707/8; 707/10

(58) Field of Classification Search ............... 707/1–10
See application file for complete search history.

(56) References Cited

U.S. PATENT DOCUMENTS 5,276,901 A * 1/1994 Howell et al. ................. 707/9
5,333,312 A * 7/1994 Wang ........................... 707/10
2002/0029296 A1* 3/2002 Anuff et al. ................. 709/311
2003/0182262 A1 9/2003 Yamamoto et al.
2005/0114672 A1* 5/2005 Duncan et al. ............. 713/182

FOREIGN PATENT DOCUMENTS

JP 3218017 10/2001

OTHER PUBLICATIONS

U.S. Appl. No. 11/737,455, filed Apr. 2007, Yamamoto et al.

* cited by examiner

*Primary Examiner*—Wilson Lee
(74) *Attorney, Agent, or Firm*—Oblon, Spivak, McClelland, Maier & Neustadt, P.C.

(57) ABSTRACT

A document management device is disclosed that enables usage of a usage-permitted folder while ensuring high security without imposing an additional load on a network. The document management device has a reception unit for receiving a request from a client for acquiring usage permission information that permits usage of a document storage unit, a generation unit for generating the usage permission information in response to the received request, and a transmission unit for transmitting the usage permission information to the client.

25 Claims, 38 Drawing Sheets

| FOLDER ID | 1048rhjofiajeor023_8482w20 |

FIG.4

| FOLDER ID | 1048rhjofiajeor023_8482w20 |
|---|---|

FIG.5

| SESSION TICKET ID | 382386-49352-9-1254 1033965394-3481-32 |
|---|---|
| FOLDER TICKET ID | cylhZXUyOTEwaGZhX2ZdOkFMTA== |

FIG.6

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:startSession xmlns:tmns=" urn:repository">
<scheme>BASIC</scheme>
<userid>test_user</userid>
<password>test_password</password>
<timeLimit>2000</timeLimit>
</tmns:startSession>
</SOAP-ENV:Body>
</SOAP-ENV:Envelope>
```

FIG.7

```
<soapenv:Envelope xmlns:soapenv="http://schemas.xmlsoap.org/soap/envelope/">
 <soapenv:Body>
  <ns1:startSessionResponse
    soapenv:encodingStyle="http://schemas.xmlsoap.org/soap/encoding/"
    xmlns:ns1="urn:repository">
   <returnValue>1033965393594-382386-42-59-12543481-32</returnValue>
  </ns1:startSessionResponse>
 </soapenv:Body>
</soapenv:Envelope>
```

FIG.8

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:getFolderTicket xmlns:tmns="urn:repository">
<sessionId>10339653593594-382386-42-59-12543481-32</sessionId>
<folderId>1048rhjofiajeor023_8482w20</folderId>
</tmns:getFolderTicket>
</SOAP-ENV:Body>
</SOAP-ENV:Envelope>
```

FIG.9

```
<soapenv:Envelope xmlns:soapenv="http://schemas.xmlsoap.org/soap/envelope/">
<soapenv:Body>
<ns1:getFolderTicketResponse
    soapenv:encodingStyle="http://schemas.xmlsoap.org/soap/encoding/"
    xmlns:ns1="urn:repository">
<returnValue>cylhZXUyOTEwaGZhX2ZdOkFMTA==</returnValue>
</ns1:getFolderTicketResponse>
</soapenv:Body>
</soapenv:Envelope>
```

FIG.10

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:scanByTickt xmlns:tmns=" urn:scan">
<ticket>cyIhZXUyOTEwaGZhX2ZdOkFMTA==</ticket>
<targetUrl>http://test.com/repository</targetUrl>
</tmns:scanByTicket>
</SOAP-ENV:Body>
</SOAP-ENV:Envelope>
```

FIG.11

```
<soapenv:Envelope xmlns:soapenv="http://schemas.xmlsoap.org/soap/envelope/">
<soapenv:Body>
<ns1:scanByTicketResponse
    soapenv:encodingStyle="http://schemas.xmlsoap.org/soap/encoding/"
    xmlns:ns1=" urn:scan ">
</ns1:scanByTicketResponse>
</soapenv:Body>
</soapenv:Envelope>
```

FIG.12

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:startSessionByTickt xmlns:tmns="urn:repository">
<ticket>cylhZXUyOTEwaGZhX2ZdOkFMTA==</ticket>
<timeLimit>2000</timeLimit>
</tmns:startSessionByTicket>
</SOAP-ENV:Body>
</SOAP-ENV:Envelope>
```

FIG.13

```
<soapenv:Envelope xmlns:soapenv="http://schemas.xmlsoap.org/soap/envelope/">
<soapenv:Body>
<ns1:startSessionByTicketResponse
    soapenv:encodingStyle="http://schemas.xmlsoap.org/soap/encoding/"
    xmlns:ns1="urn:repository">
<returnValue>382386-49352-59-1254 1033965394-3481-32</returnValue>
</ns1:startSessionByTicketResponse>
</soapenv:Body>
</soapenv:Envelope>
```

FIG.14

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:getFolderIdByTicket xmlns:tmns="urn:repository"
    xmlns:ns1="urn:repository">
<sessionId>382386-49352-59-1254 1033965394-3481-32</sessionId>
<ticket>cylhZXUyOTEwaGZhX2ZdOkFMTA==</ticket>
</tmns:getFolderByTicket>
</SOAP-ENV:Body>
</SOAP-ENV:Envelope>
```

FIG.15

```
<soapenv:Envelope xmlns:soapenv="http://schemas.xmlsoap.org/soap/envelope/">
 <soapenv:Body>
  <ns1:getFolderIdByTicketResponse
    soapenv:encodingStyle="http://schemas.xmlsoap.org/soap/encoding/"
    xmlns:ns1="urn:repository">
   <returnValue>1048rhjofiajeor023_8482w20</returnValue>
  </ns1:getFolderIdByTicketResponse>
 </soapenv:Body>
</soapenv:Envelope>
```

FIG.16

```
<SOAP-ENV:Envelope xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:putDoc xmlns:tmns="urn:repository" xmlns:ns1="urn:repository">
<sessionId>382386-49352-59-1254 1033965394-3481-32</sessionId>
<folderId>1048rhjofiajeor023_8482w20</folderId>
<title>test document</title>
<creator>user1</creator>
<content>MQ==</content>
</tmns:putDoc>
</SOAP-ENV:Body>
</SOAP-ENV:Envelope>
```

FIG.17

```
<soapenv:Envelope xmlns:soapenv="http://schemas.xmlsoap.org/soap/envelope/">
<soapenv:Body>
<ns1:putDocResponse
    soapenv:encodingStyle="http://schemas.xmlsoap.org/soap/encoding/"
    xmlns:ns1="urn:repository">
<returnValue>116g8raba9=saffadadfa</returnValue>
</ns1:putDocResponse>
</soapenv:Body>
</soapenv:Envelope>
```

FIG.18

```
<SOAP-ENV:Envelope xmlns:SOAP-ENC="http://schemas.xmlsoap.org/soap/encoding/"
  SOAP-ENV:encodingStyle="http://schemas.xmlsoap.org/soap/encoding/"
  xmlns:SOAP-ENV="http://schemas.xmlsoap.org/soap/envelope/">
<SOAP-ENV:Body>
<tmns:getDocList xmlns:tmns="urn:repository" xmlns:ns1="urn:repository">
  <sessionId>382386-49352-59-1254 1033965394-3481-32</sessionId>
  <folderId>1048rhjofiajeor023_8482w20</folderId>
</tmns:getFolderIdByTicket>
</SOAP-ENV:Body>
</SOAP-ENV:Envelope>
```

FIG.19

```
<soapenv:Envelope xmlns:soapenv="http://schemas.xmlsoap.org/soap/envelope/">
<soapenv:Body>
<ns1:getDocListResponse
  soapenv:encodingStyle="http://schemas.xmlsoap.org/soap/encoding/"
  xmlns:ns1="urn:repository">
<returnValue SOAP-ENC:Array=" ns1:propertyList[1]">
<item>
<identifier>116g8raba9=saffadadfa</identifier>
<title>test document</title>
<creator>user1</creator>
</item>
</returnValue>
</ns1:getDocListResponse>
</soapenv:Body>
</soapenv:Envelope>
```

FIG.20

```
<SOAP-ENV:Envelope xmlns:SOAP-ENC="http://schemas.xmlsoap.org/soap/encoding/"
  SOAP-ENV:encodingStyle="http://schemas.xmlsoap.org/soap/encoding/"
  xmlns:SOAP-ENV="http://schemas.xmlsoap.org/soap/envelope/">
<SOAP-ENV:Body>
<tmns:getDocContent xmlns:tmns="urn:repository" xmlns:ns1="urn:repository">
<sessionId>382386-49352-59-1254 1033965394-3481-32</sessionId>
<docId>116g8raba9=saffadafda</docId>
</tmns:getDocContent>
</SOAP-ENV:Body>
</SOAP-ENV:Envelope>
```

FIG.21

```
<soapenv:Envelope xmlns:soapenv="http://schemas.xmlsoap.org/soap/envelope/">
<soapenv:Body>
<ns1:getDocContentResponse
    soapenv:encodingStyle="http://schemas.xmlsoap.org/soap/encoding/"
    xmlns:ns1="urn:repository">
<returnValue>MQ==</returnValue>
</ns1:getDocContentResponse>
</soapenv:Body>
</soapenv:Envelope>
```

FIG.23

```
<SOAP-ENV:Envelope
    xmlns:SOAP-ENV="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:getFolderTicket xmlns:tmns="urn:repository">
<sessionId>1033965393594-382386-42-59-12543481-32</sessionId>
<folderId>1048rhjofiajeor023_8482w20</folderId>
<timeLimit>1800</timeLimit>
</tmns:getFolderTicket>
</SOAP-ENV:Body>
</SOAP-ENV:Envelope>
```

| FOLDER ID | 1048rhjofiajeor023_8482w20 |
|---|---|
| TIME LIMIT | 2002-12-24T12:00:00 |

FIG.26

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:getFolderTicket xmlns:tmns=" urn:repository">
<sessionId>10339653939594-382386-42-59-12543481-32</sessionId>
<folderId>1048rhjofiajeor023_8482w20</folderId>
<entryCount>10</entryCount>
</tmns:getFolderTicket>
</SOAP-ENV:Body>
</SOAP-ENV:Envelope>
```

| FOLDER ID | 1048rhjofiajeor023_8482w20 |
|---|---|
| CONNECTION LIMIT | 3 |

FIG.29

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:getFolderTicket xmlns:tmns=" urn:repository">
<sessionId>10339653593594-382386-42-59-12543481-32</sessionId>
<folderId>1048rhjofiajeor023_8482w20</folderId>
<putDocCount>10</putDocCount>
</tmns:getFolderTicket>
</SOAP-ENV:Body>
</SOAP-ENV:Envelope>
```

FIG.30

| FOLDER ID | 1048rhjofiajeor023_8482w20 |
|---|---|
| STORAGE OPERATION LIMIT | 3 |

FIG.31

| SESSION TICKET ID | 382386-49352-9-1254 1033965394-3481-32 |
|---|---|
| FOLDER TICKET ID | cylhZXUyOTEwaGZhX2ZdOkFMTA== |

FIG.33

```
<SOAP-ENV:Envelope
    xmlns:SOAP-ENV="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:getFolderTicket xmlns:tmns="urn:repository">
<sessionId>103396539394-382386-42-59-125433481-32</sessionId>
<folderId>1048rhjofiajeor023_8482w20</folderId>
<putDocCapacity>10</putDocCapacity>
</tmns:getFolderTicket>
</SOAP-ENV:Body>
</SOAP-ENV:Envelope>
```

FIG.34

| FOLDER ID | 1048rhjofiajeor023_8482w20 |
|---|---|
| STORAGE CAPACITY LIMIT | 5 |

FIG.35

| SESSION TICKET ID | 382386-49352-9-1254 1033965394-3481-32 |
|---|---|
| FOLDER TICKET ID | cylhZXUyOTEwaGZhX2ZdOkFMTA== |

FIG.37

```
<SOAP-ENV:Envelope
    xmlns:SOAP-ENC="http://schemas.xmlsoap.org/soap/encoding/"
    SOAP-ENV:encodingStyle="http://schemas.xmlsoap.org/soap/encoding/"
    xmlns:SOAP-ENV="http://schemas.xmlsoap.org/soap/envelope/">
<SOAP-ENV:Body>
<tmns:getFolderTicket xmlns:tmns="urn:repository">
<sessionId>103396539594-382386-42-59-125433481-32</sessionId>
<folderIds SOAP-ENC:arrayType=" xs:string[3]">
<item>1048rhjofiajeor023_8482w20</item>
<item>eo1048r023_848hjofiajr2w20</item>
<item>821048hj23_84rw2ofiajeor00</item>
</folderIds>
<timeLimit>180</timeLimit>
</tmns:getFolderTicket>
</SOAP-ENV:Body>
</SOAP-ENV:Envelope>
```

| FOLDER ID |
|---|
| 1048rhjofiajeor023_8482w20 |
| eo1048r023_848hjofiajr2w20 |
| 821048hj23_84rw2ofiajeor00 |

FIG.42

```
<soapenv:Envelope xmlns:soapenv="http://schemas.xmlsoap.org/soap/envelope/">
<soapenv:Body>
<ns1:putDocResponse
    soapenv:encodingStyle="http://schemas.xmlsoap.org/soap/encoding/"
    xmlns:ns1="urn:repository">
<returnValue>116g8raba9=saffadadfa</returnValue>
<docTicket>NDk3MDM0NTA5MjgxOTI=</docTicket>
</ns1:putDocResponse>
</soapenv:Body>
</soapenv:Envelope>
```

FIG.44

| FOLDER ID | 1048rhjofiajeor023_8482w20 |
|---|---|
| DOCUMENT ID | 116g8raba9==saffadadfa |

DOCUMENT MANAGEMENT DEVICE AND METHOD, PROGRAM THEREFOR, AND STORAGE MEDIUM

BACKGROUND OF THE INVENTION

1. Field of the Invention

The present invention relates to a document management device, a document management method, a program for document management, and a storage medium.

2. Description of the Related Art

In a server having folders for storing documents, in general, it is set that each user is allowed to use specific folders. For example, the server may permit a user A to store documents (authority of storage) and to rewrite/delete documents in a folder C of the server (authority of rewrite/deletion), and the server may also grant another user B only an authority of storage in the folder C of the server, that is, permits the user B to store documents in the folder C.

For example, the user A sends its username and password from a device X to the server through a network, and when connection between the device X with the server is allowed, the user A sends documents held in the device X to the server, and stores the documents in the folder C of the server, or rewrites or deletes the documents in the folder C. For example, Japanese Patent Application No. 3218017 discloses a technique in this field.

In the related art, however, if documents are not held in the device X but in a device Y, which is connected with the device X through the network, the user A is not allowed to store documents in folders of the server directly from the device Y from the point of view of security of the system, although the operation of the user A from the device X is allowed. In order to store documents held in the device Y in the server, the documents have to be first transferred to the device X from the device Y through the network, and then the user A can store the transferred documents to the server from the device X. As result, additional loads are imposed on the network.

SUMMARY OF THE INVENTION

Accordingly, it is a general object of the present invention to solve the above problems of the related art.

A more specific object of the present invention is to provide a device and a method for document management enabling usage of a usage-permitted folder while ensuring high security without imposing an additional load on a network.

According to a first aspect of the present invention, there is provided a document management device having a document storage unit for storing a document. The document management device includes a usage permission information request reception unit configured to receive a request from a client for acquiring usage permission information that permits usage of the document storage unit, a usage permission information generation unit configured to generate the usage permission information in response to the received request, and a usage permission information transmission unit configured to transmit the usage permission information to the client.

According to the present invention, because the document management device includes a usage permission information request reception unit for receiving a request for acquiring usage permission information that permits usage of the document storage unit, a usage permission information generation unit for generating the usage permission information in response to the received request, and a usage permission information transmission unit for transmitting the usage permission information to the client, it is possible to use a usage-permitted folder while ensuring high security without imposing an additional load on a network.

As an embodiment, the usage permission information generation unit generates the usage permission information and identification information of the usage permission information, and holds the usage permission information.

According to the present invention, because the usage permission information generation unit generates the usage permission information and identification information thereof and holds the usage permission information, it is possible to manage the usage permission information.

As an embodiment, the usage permission information transmission unit transmits the identification information to the client as the usage permission information.

In response to the present invention, because the usage permission information transmission unit transmits the identification information to the client as the usage permission information, the identification information is provided to the client as the usage permission information.

As an embodiment, the usage permission information includes identification information of the document storage unit and authority information of the usage permission information.

According to the present invention, because the usage permission information includes identification information of the document storage unit and authority information of the usage permission information, it is possible to provide the usage permission information of different authorities.

As an embodiment, the usage permission information includes identification information of the document storage unit and effective period information of the usage permission information.

According to the present invention, because the usage permission information includes identification information of the document storage unit and effective period information of the usage permission information, it is possible to set an effective period in the usage permission information.

As an embodiment, the usage permission information includes identification information of the document storage unit and information of a maximum number of connections with the document management device.

According to the present invention, because the usage permission information includes identification information of the document storage unit and information of a maximum number of connections with the document management device, it is possible to set a maximum number of connections with the document management device in the usage permission information.

As an embodiment, the usage permission information includes identification information of the document storage unit and information of a maximum number of operations of document storage in the document storage unit.

According to the present invention, because the usage permission information includes identification information of the document storage unit and information of a maximum number of operations of document storage in the document storage unit, it is possible to set the maximum number of document storage operations in the document storage unit in the usage permission information.

As an embodiment, the usage permission information includes identification information of the document storage unit and information of a capacity of effective document storage in the document storage unit.

According to the present invention, because the usage permission information includes identification information of the document storage unit and information of a capacity of effective document storage in the document storage unit, it is possible to set the effective document storage capacity in the usage permission information.

As an embodiment, the usage permission information includes identification information of a plurality of the document storage units.

According to the present invention, because the usage permission information includes identification information of a plurality of the document storage units, it is possible to permit usage of more than one document storage units.

As an embodiment, the document management device further has a usage request reception unit configured to receive a request from a client for using the document storage unit, and a usage unit configured to use the document storage unit according to the usage permission information.

According to the present invention, because the document management device further has a usage request reception unit to receive a request for using the document storage unit and a usage unit to use the document storage unit, it is possible to allow the client requesting the usage permission information to use the document storage unit.

As an embodiment, the client requesting usage of the document storage unit is different from the client that receives the usage permission information transmitted from the usage permission information transmission unit.

According to the present invention, because the client requesting usage of the document storage unit is different from the client that receives the usage permission information transmitted from the usage permission information transmission unit, it is possible to receive and process requests from clients other than the client that is permitted to use the usage-permitted folder.

As an embodiment, the usage request includes information on the document and information on the document storage unit.

According to the present invention, because the usage request includes information on the document and information on the document storage unit, it is possible to store a specified document in the document storage unit permitted for use, or to rewrite or delete the documents held in the document storage unit permitted for use.

As an embodiment, the usage unit stores the document in the document storage unit according to the usage permission information.

According to the present invention, because the usage unit stores the document in the document storage unit according to the usage permission information, it is possible to store a specified document in the document storage unit permitted for use.

As an embodiment, the document management device further has a document identification information appending unit configured to append document identification information for identifying the stored document to the usage permission information. The information is appended as an editable data.

According to the present invention, because the document management device has a document identification information appending unit to append document identification information to the usage permission information, and the information is appended as an editable data, the client that stores the specified document in the document storage unit is able to modify the stored document.

As an embodiment, the document management device further has a document identification information transmission unit configured to transmit the document identification information for identifying the stored document to the client that requests usage of the document storage unit.

According to the present invention, because the document management device further has a document identification information transmission unit to transmit the document identification information, the client that stores the specified document in the document storage unit is able to identify the stored document.

As an embodiment, the document management device further has a document usage permission information transmission unit configured to transmit information for permitting usage of the stored document to the client that requests usage of the document storage unit.

According to the present invention, because the document management device has a document usage permission information transmission unit to transmit information for permitting usage of the stored document, the client that stores the specified document in the document storage unit is able to utilize the stored document.

As an embodiment, the usage unit includes a determination unit that determines whether the document storage unit requested by the usage request is at a lower level than the document storage unit permitted for use by the usage permission information generated by the usage permission information generation unit.

According to the present invention, because the usage unit includes a determination unit to determine if the document storage unit requested by the usage request is at a lower level than the document storage unit permitted for use by the usage permission information, it is possible to permit use of the document storage unit even if the document storage unit specified by the client is at a lower level than the document storage unit permitted for use.

As an embodiment, the document management device further has a document list information request reception unit configured to receive a request from a client for acquiring document list information of documents stored in the document storage unit, and a document list information transmission unit configured to transmit the document list information to the client.

According to the present invention, because the document management device has a document list information request reception unit to receive a request from a client for acquiring document list information of the stored documents and a document list information transmission unit to transmit the document list information to the client, it is possible to provide a document list to the client when necessary.

As an embodiment, the document management device further has a document content information request reception unit configured to receive a request from a client for acquiring information of contents of the document stored in the document storage unit, and a document content information transmission unit configured to transmit the document content information to the client in response to the received request.

According to the present invention, because the document management device has a document content information request reception unit to receive a request from a client for acquiring document content information and a document content information transmission unit to transmit the document content information to the client in response to the received request, it is possible to provide contents of the document to the client when necessary.

As an embodiment, the document management device further has a connection permission request reception unit configured to receive a request from a client for acquiring connection permission information that includes the usage permission information and permits connection with the document management device, a connection permission information generation unit configured to generate the connection permission information in response to the received request, and a connection permission information transmission unit configured to transmit the connection permission information to the client.

According to the present invention, because the document management device has a connection permission request reception unit to receive a request from a client for acquiring connection permission information that includes the usage permission information and permits connection with the document management device, a connection permission information generation unit to generate the connection permission information in response to the received request, and a connection permission information transmission unit to transmit the connection permission information to the client, it is possible to supply the connection permission information including the usage permission information to the client that makes the request to acquire the information.

As an embodiment, the document management device further comprises an identification information request reception unit to receive a request from a client for acquiring identification information of the document storage unit, and an identification information transmission unit to transmit the identification information to the client that requests the information. The identification information of the document storage unit includes the connection permission information and the usage permission information.

According to the present invention, because the document management device further has an identification information request reception unit to receive a request from a client for acquiring identification information of the document storage unit, and an identification information transmission unit to transmit the identification information to the client requesting the information, it is possible to supply the identification information of the document storage unit including the connection permission information and the usage permission information to the client requesting to acquire the information.

According to a second aspect of the present invention, there is provided a method of a document management device having a document storage unit for storing a document, the method includes the steps of receiving a request from a client for acquiring usage permission information that permits usage of the document storage unit, generating the usage permission information in response to the received request, and transmitting the usage permission information to the client.

According to the present invention, because the document management method includes the steps of receiving a request from a client for acquiring usage permission information that permits usage of the document storage unit, generating the usage permission information in response to the received request, and transmitting the usage permission information to the client, it is possible to use a usage-permitted folder while ensuring high security without imposing an additional load on a network.

As an embodiment, the document management method further includes the steps of receiving a request from a client for using the document storage unit, and using the document storage unit according to the usage permission information.

According to the present invention, because the document management method further includes the steps of receiving a request for using the document storage unit, and using the document storage unit according to the usage permission information, it is possible to allow the client that made the request to use the document storage unit.

As an embodiment, the client that requests usage of the document storage unit is different from the client that receives the usage permission information transmitted in the step of transmitting the usage permission information.

According to the present invention, because the client requesting usage of the document storage unit is different from the client that receives the usage permission information transmitted in the step of transmitting the usage permission information, it is possible to receive and process requests from other clients than the client that is permitted to use the usage-permitted folder.

According to a third aspect of the present invention, there is provided a program executable by a computer for operating a document management device having a document storage unit for storing a document, including the steps of receiving a request from a client for acquiring usage permission information that permits usage of the document storage unit, generating the usage permission information in response to the received request, and transmitting the usage permission information to the client.

According to a fourth aspect of the present invention, there is provided a storage medium storing a program executable by computer for operating a document management device having a document storage unit for storing a document, including the steps of receiving a request from a client for acquiring usage permission information that permits usage of the document storage unit, generating the usage permission information in response to the received request, and transmitting the usage permission information to the client.

These and other objects, features, and advantages of the present invention will become more apparent from the following detailed description of preferred embodiments given with reference to the accompanying drawings.

BRIEF DESCRIPTION OF THE DRAWINGS

FIG. 4 is a table showing an example of a folder ticket;

FIG. 5 is a table showing an example of a folder-ticket-associated session ticket;

FIG. 6 is a program showing an example of a session ticket acquisition request;

FIG. 7 is a program showing an example of a session ticket acquisition response;

FIG. 8 is a program showing an example of a folder ticket acquisition request;

FIG. 9 is a program showing an example of a folder ticket acquisition response;

FIG. 10 is a program showing an example of a document storage information request;

FIG. 11 is a program showing an example of a document storage information response;

FIG. 12 is a program showing an example of a folder-ticket-associated session ticket acquisition request;

FIG. 13 is a program showing an example of a folder-ticket-associated session ticket acquisition response;

FIG. 14 is a program showing an example of a folder-ticket-associated folder ID acquisition request;

FIG. 15 is a program showing an example of a folder-ticket-associated folder ID acquisition response;

FIG. 16 is a program showing an example of a document storage request;

FIG. 17 is a program showing an example of a document storage response;

FIG. 18 is a program showing an example of a document list acquisition request;

FIG. 19 is a program showing an example of a document list acquisition response;

FIG. 20 is a program showing an example of a document content acquisition request;

FIG. 21 is a program showing an example of a document content acquisition response;

FIG. 23 is a program showing a second example of the folder ticket acquisition request;

FIG. 26 is a program showing a third example of the folder ticket acquisition request;

FIG. 29 is a program showing a fourth example of the folder ticket acquisition request;

FIG. 30 is a table showing a fourth example of the folder ticket;

FIG. 31 is a table showing a second example of the folder-ticket-associated session ticket;

FIG. 33 is a program showing a fifth example of the folder ticket acquisition request;

FIG. 34 is a table showing a fifth example of the folder ticket;

FIG. 35 is a table showing a third example of the folder-ticket-associated session ticket;

FIG. 37 is a program showing a sixth example of the folder ticket acquisition request;

FIG. 42 is a program showing another example of the document storage response;

FIG. 44 is a table showing another example of the folder ticket.

DESCRIPTION OF THE PREFERRED EMBODIMENTS

Below, preferred embodiments of the present invention are explained with reference to the accompanying drawings.

Figure 1:
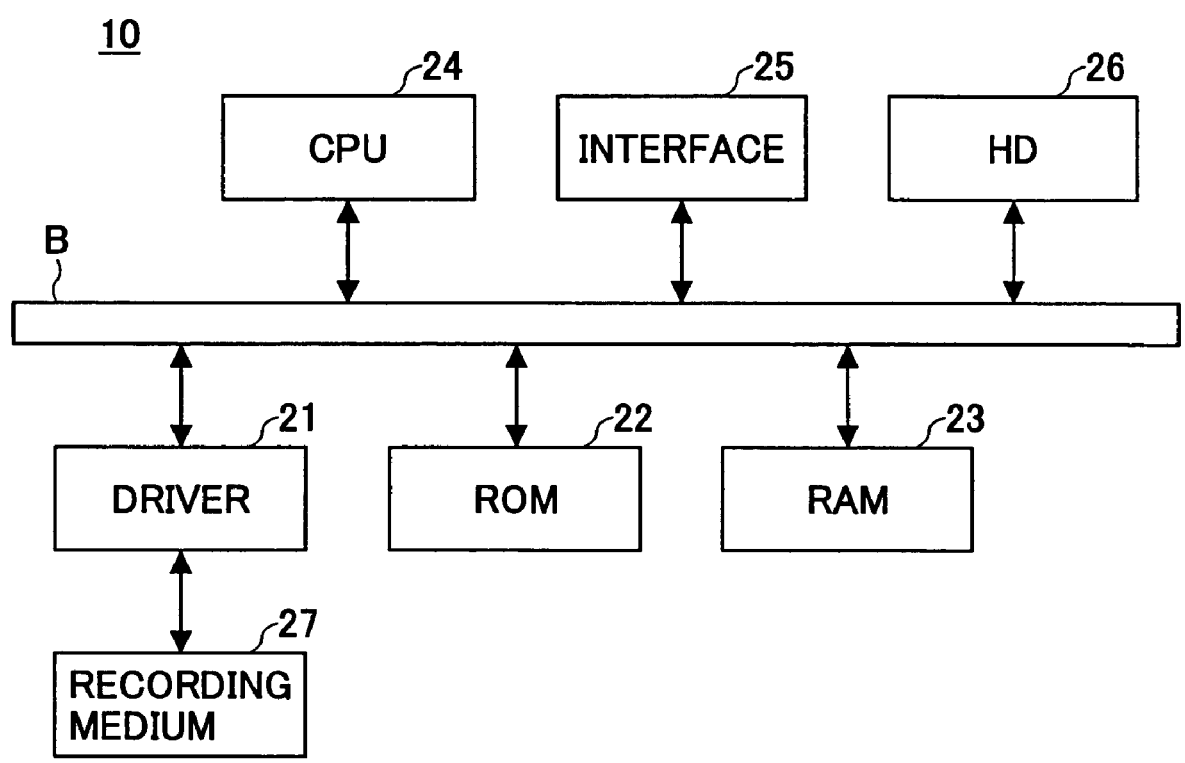
FIG. 1 is a schematic view of a hardware configuration of a document management server 10 according to the present invention.

FIG. 1 is a schematic view of a hardware configuration of a document management server 10 according to the present invention. Note that FIG. 1 shows only elements necessary to explanations, and other elements irrelevant to explanations are omitted. It is the same for other figures below.

As shown in FIG. 1, the document management server 10 includes a driver 21, a ROM (Read Only Memory) 22, a RAM (Random Access Memory) 23, a CPU (Central Processing Unit) 24, an interface 25, a hard disk (HD) 26, and a recording medium 27. The elements 21, 22, 23, 24, 25, and 26 are connected with each other through a bus B.

The interface 25 connects the document management server 10 with a not-illustrated network.

Programs executed in the document management server 10 may be provided from the recording medium 27, or may be downloaded through the network.

The recording medium 27 is installed in the driver 21; data or programs of the document management server 10 are installed in the ROM 22 through the driver 21 and the bus B. For example, the recording medium 27 may be a CD-ROM.

ROM 22 stores data or programs of the document management server 10. RAM 23 reads out the programs from the ROM 22 when the document management server 10 is booted and stores the programs. CPU 24 executes processing according to the programs stored in RAM 23.

HD 26 stores data, file and documents described below.

Below, operation of document storage in the document management server 10 is described to illustrate an example of the document management method of the present invention and the operations of the document management server 10.

Figure 2:
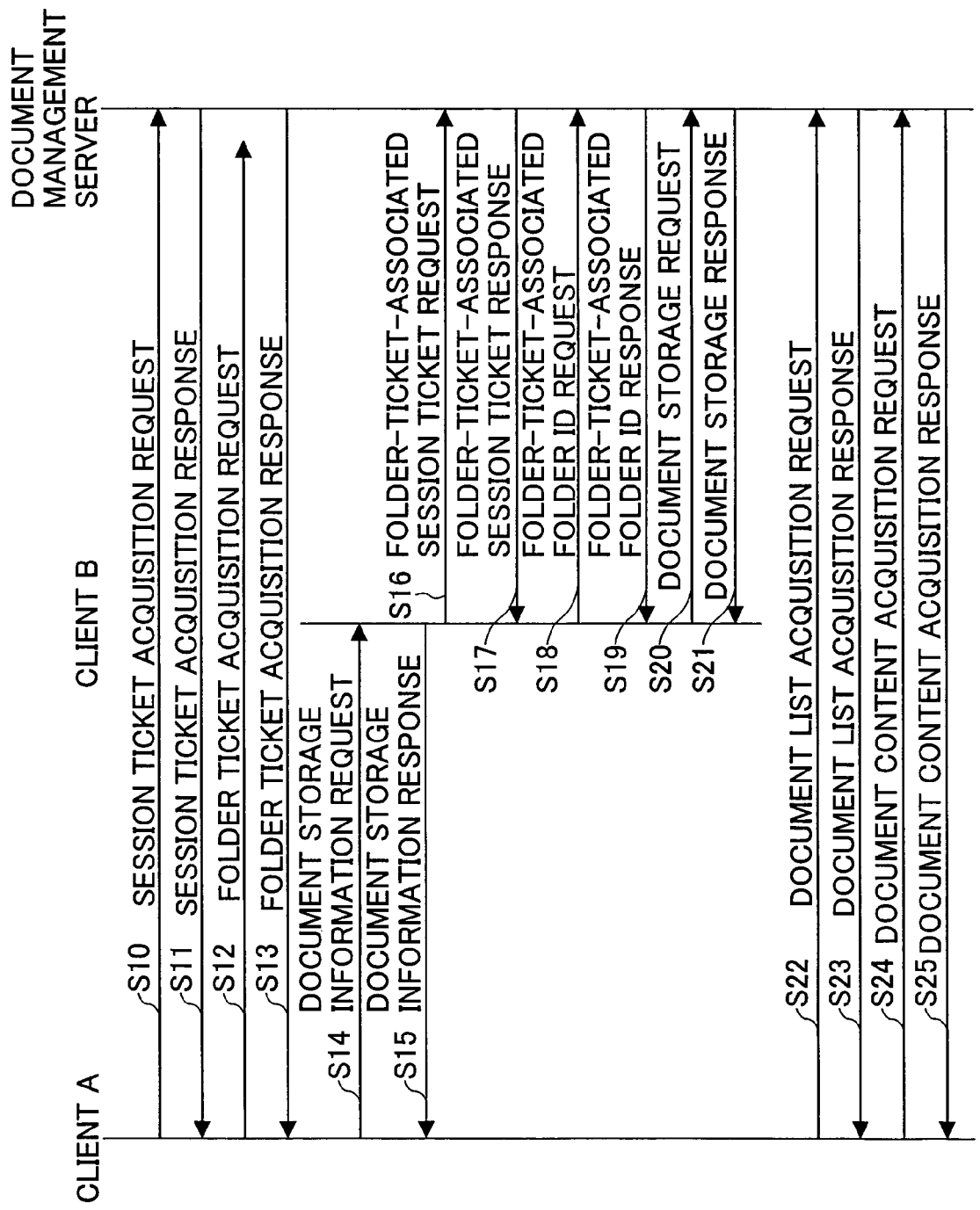
FIG. 2 is a diagram showing a document storage operation in the document management server 10 as an example of a document management method of the present invention and an operation of the document management server 10.

FIG. 2 is a diagram showing the document storage operation in the document management server 10 as an example of the document management method of the present invention and the operation of the document management server 10.

In step S10, client A, being connected with the document management server 10 through the network, sends a session ticket acquisition request to the document management server 10 to obtain a session ticket, which permits connection of the client A with the document management server 10. An example of the session ticket acquisition request is illustrated below with reference to FIG. 6.

Next, in step S11, the document management server 10 creates contents of the session ticket and a session ticket ID (IDentification) in response to the session ticket acquisition request, and sends a session ticket acquisition response to the client A. The session ticket acquisition response includes the session ticket ID which is used to represent the session ticket. An example of the session ticket acquisition response is illustrated below with reference to FIG. 7.

Next, in step S12, the client A sends a folder ticket acquisition request to the document management server 10 to obtain a folder ticket, which is usage permission information for using folders of the document management server 10. The folder ticket acquisition request includes the session ticket obtained in step S11. An example of the folder ticket acquisition request is illustrated below with reference to FIG. 8.

Next, in step S13, the document management server 10 creates contents of the folder ticket and a folder ticket ID in response to the folder ticket acquisition request, and sends a folder ticket acquisition response to the client A. The folder ticket acquisition response includes the folder ticket ID which is used to represent the folder ticket. The document management server 10 also holds the created folder ticket. An example of the folder ticket acquisition response is illustrated below with reference to FIG. 9, and an example of the folder ticket is illustrated below with reference to FIG. 4.

Next, in step S14, the client A sends a document storage information request to a client B. The document storage information request includes the folder ticket; and it indicates a folder of the document management server 10 and a document to be stored in the folder. An example of the document storage information request is illustrated below with reference to FIG. 10.

Next, in step S15, the client B sends a document storage information response to the client A in response to the document storage information request obtained in step S14. An example of the document storage information response is illustrated below with reference to FIG. 11.

Next, in step S16, the client B sends a session ticket acquisition request to the document management server 10 to obtain a session ticket, which permits connection of the client B with the document management server 10. The session ticket acquisition request includes the folder ticket, and this session ticket requested by the client B is therefore associated with the folder ticket obtained from the client A in the step S13. Below, this session ticket is referred to as a "folder-ticket-associated session ticket", and the session ticket acquisition request made by the client B in the present step is referred to as a "folder-ticket-associated session ticket acquisition request". An example of the folder-ticket-associated session ticket acquisition request is illustrated below with reference to FIG. 12.

Next, in step S17, the document management server 10 creates contents of the folder-ticket-associated session ticket and a folder-ticket-associated session ticket ID in response to the folder-ticket-associated session ticket acquisition request, and sends a folder-ticket-associated session ticket acquisition response to the client B. The folder-ticket-associated session ticket acquisition response includes the folder-ticket-associated session ticket ID to represent the folder-ticket-associated session ticket. The document management server 10 holds the created folder-ticket-associated session ticket. An example of the folder-ticket-associated session ticket acquisition response is illustrated below with reference to FIG. 13, and an example of the folder-ticket-associated session ticket is illustrated below with reference to FIG. 5.

Next, in step S18, the client B sends a folder ID acquisition request to the document management server 10 to obtain a folder ID, which is the ID of the folder permitted to be used by the document management server 10, and the folder ID acquisition request includes the folder ticket obtained in step S14 and the session ticket obtained in step S17. Similarly, this folder ID requested by the client B is associated with the folder ticket obtained from the client A in the step S13. Below, this folder ID is referred to as a "folder-ticket-associated folder ID", and the folder ID acquisition request made by the client B in the present step is referred to as a "folder-ticket-associated folder ID acquisition request". An example of the folder-ticket-associated folder ID acquisition request is illustrated below with reference to FIG. 14.

Next, in step S19, the document management server 10 sends a folder-ticket-associated folder ID acquisition response to the client B in response to the folder-ticket-associated folder ID acquisition request obtained in step S18. The folder-ticket-associated folder ID acquisition response includes the folder-ticket-associated folder ID. An example of the folder-ticket-associated folder ID acquisition response is illustrated below with reference to FIG. 15.

Next, in step S20, the client B sends a document storage request to the document management server 10. The document storage request includes the folder-ticket-associated session ticket obtained in step S17, the folder-ticket-associated folder ID obtained in step S19 and contents of the documents to be stored. An example of the document storage request is illustrated below with reference to FIG. 16.

Next, in step S21, in response to the document storage request obtained in step S20, the document management server 10 sends a document storage response to the client B. The document storage response directs to store the specified document to the specified folder and includes a document ID for identifying the stored document. An example of the document storage response is illustrated below with reference to FIG. 17.

Next, in step S22, the client A sends a document list acquisition request to the document management server 10 to obtain a document list of the documents stored in the folder of the document management server 10. An example of the document list acquisition request is illustrated below with reference to FIG. 18.

Next, in step S23, the document management server 10 sends a document list acquisition response in response to the document list acquisition request obtained in step S22 to the client A. The document list acquisition response includes the document list. An example of the document list acquisition response is illustrated below with reference to FIG. 19.

Next, in step S24, the client A sends a document content acquisition request to the document management server 10 to obtain the contents of the document stored in the folder of the document management server 10. An example of the document content acquisition request is illustrated below with reference to FIG. 20.

Next, in step S25, the document management server 10 sends a document content acquisition response in response to the document content acquisition request obtained in step S24 to the client A. The document content acquisition response includes the contents of the document. An example of the document content acquisition response is illustrated below with reference to FIG. 21.

According to the method illustrated in FIG. 2, a user transfers a folder ticket from the client A to the client B. thereby, enabling direct storage of documents in the document management server 10 from the client B.

Therefore, once the client A obtains a document from the client B, the client A then transmits the document to the document management server 10. Therefore, it is not necessary to store the document, and there is no additional load imposed on the network.

Certainly, the client A may use the folder ticket to store the documents held by itself in the document management server 10.

Figure 3:
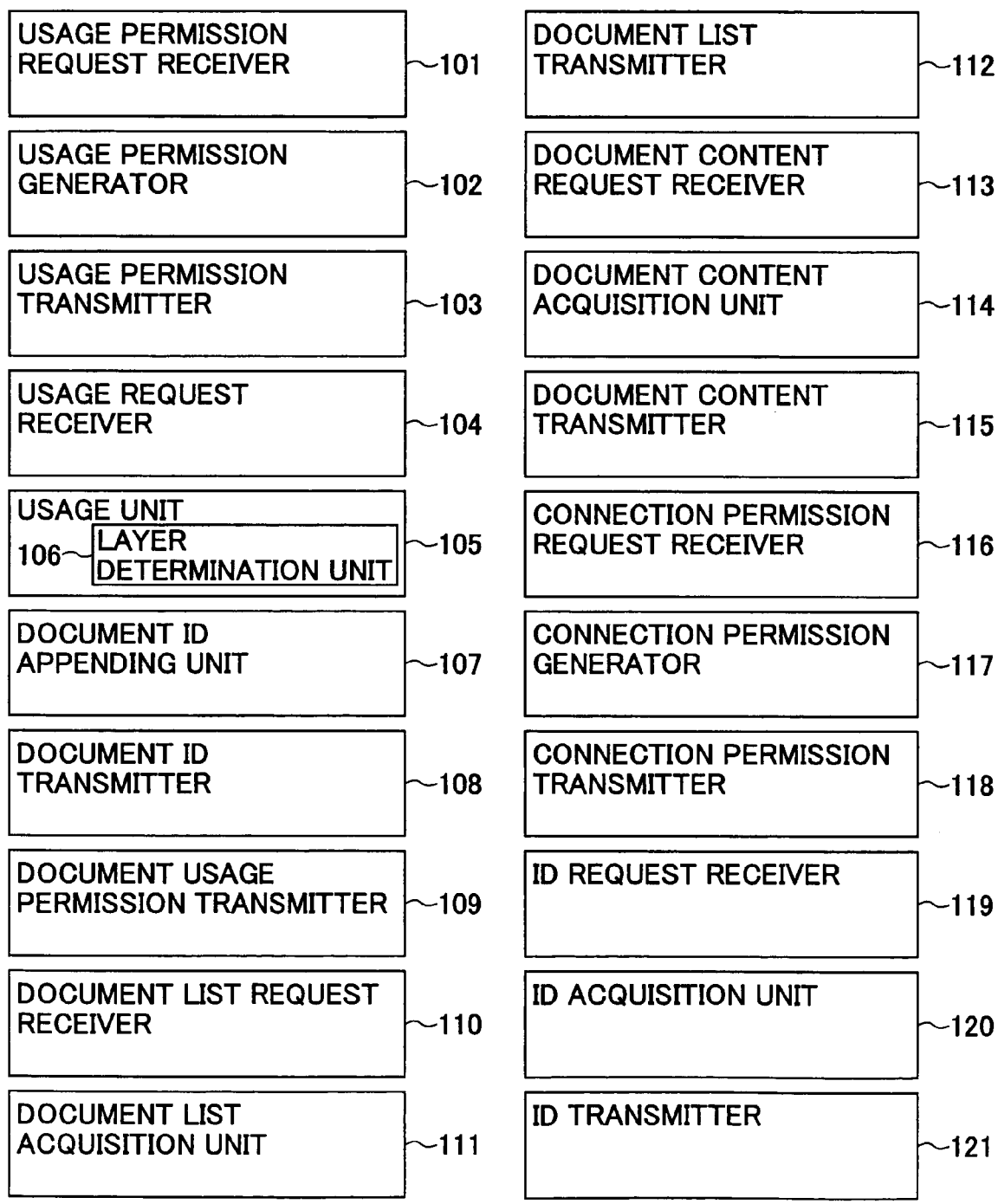
FIG. 3 is a block view showing an example of a functional configuration of the document management server 10.

Next, an example of the functional configuration of the document management server 10 is explained with respect to FIG. 3.

FIG. 3 is a block view showing an example of the functional configuration of the document management server 10.

As shown in FIG. 3, the document management server 10 includes a usage permission information request reception unit 101, a usage permission information generation unit 102, a usage permission information transmission unit 103, a usage request reception unit 104, a usage unit 105, a layer determination unit 106 in the usage unit 105, a document identification information appending unit 107, a document identification information transmission unit 108, a document usage permission information transmission unit 109, a document list information request reception unit 110, a document list information acquisition unit 111, a document list information transmission unit 112, a document content information request reception unit 113, a document content information acquisition unit 114, a document content information transmission unit 115, a connection permission request reception unit 116, a connection permission information generation unit 117, a connection permission information transmission unit 118, an identification information request reception unit 119, an identification information acquisition unit.120, and an identification information transmission unit 121.

The usage permission information request reception unit 101 receives the folder ticket acquisition request from a client.

The usage permission information generation unit 102 creates the folder ticket in response to the folder ticket acquisition request received in the usage permission information request reception unit 101. The usage permission information generation unit 102 may also hold and manage the created folder ticket.

The usage permission information transmission unit 103 sends the folder ticket ID for identifying the folder ticket created in the usage permission information generation unit 102 to the client. The usage permission information transmission unit 103 may first encrypt the folder ticket ID before sending it to the client.

The usage request reception unit 104 is a receiver to receive a request of usage of a folder, for example, the usage request reception unit 104 receives the document storage request from the client.

The usage unit 105 is for utilizing a folder in response to the request received in the usage request reception unit 104. For example, in response to the request, the usage unit 105 stores a specified document in the specified folder.

The layer determination unit 106 determines whether the folder specified by the usage request received in the usage request reception unit 104 is at a lower level than the folder that is permitted for use by the folder ticket.

The document identification information appending unit 107 appends, for example, a document ID for identifying the stored document to the folder ticket with the document ID being an editable text.

The document identification information transmission unit 108 transmits, for example, the document ID for identifying the stored document to the original client requesting to store the document.

The document usage permission information transmission unit 109 transmits, for example, a document ticket for permitting usage of the stored document to the original client requesting to store the document.

The document list information request reception unit 110 receives the document list acquisition request from the client desiring to obtain the document list information of the documents stored in the folder.

The document list information acquisition unit 111, in response to the document list acquisition request received in the document list information request reception unit 110, acquires a list of the documents stored in the corresponding folder.

The document list information transmission unit 112 transmits the document list acquisition response including the document list obtained in the document list information acquisition unit 111 to the client.

The document content information request reception unit 113 receives the document content acquisition request from the client desiring to obtain the contents of the document stored in the folder.

The document content information acquisition unit 114 acquires the contents of the document stored in the corresponding folder in response to the document content acquisition request received in the document content information request reception unit 113.

The document content information transmission unit 115 transmits the document content acquisition response including the contents of the document obtained in the document content information acquisition unit 114 to the client.

The connection permission request reception unit 116 receives the folder-ticket-associated session ticket acquisition request from the client.

The connection permission information generation unit 117 creates the folder-ticket-associated session ticket in response to the folder-ticket-associated session ticket acquisition request received in the connection permission request reception unit 116.

The connection permission information transmission unit 118 sends to the client the folder-ticket-associated session ticket acquisition response including a session ticket ID for identifying the folder-ticket-associated session ticket created in the connection permission information generation unit 117.

The identification information request reception unit 119 receives the folder-ticket-associated folder ID acquisition request from the client.

The identification information acquisition unit 120 acquires the folder ID in response to the folder-ticket-associated folder ID acquisition request received in the identification information request reception unit 119.

The identification information transmission unit 121 transmits to the client the folder ID acquisition response including the folder ID obtained in the identification information acquisition unit 120.

FIG. 4 is a table showing an example of the folder ticket.

As shown in FIG. 4, in the folder ticket, there is a folder ID for identifying the folder that the folder ticket is permitted to use. Once the folder ticket acquisition request is received, the document management server 10 creates the folder ticket associated with the folder ticket acquisition request and holds the folder ticket.

The folder ticket may also include information on the authority of the folder ticket, In addition to the folder ID shown in FIG. 4.

For example, the folder ticket shown in FIG. 4 may include data indicating whether the folder ticket only has the authority of storing documents in the folder, or has all of the authorities of storing documents in the folder, rewriting the stored documents, and deleting the stored documents.

By incorporating the authority information into the folder ticket, the document management server 10 can provide folder tickets having different authorities for the client.

FIG. 5 is a table showing an example of a folder-ticket-associated session ticket.

As shown in FIG. 5, in the folder-ticket-associated session ticket, there are a session ticket ID and a folder ticket ID. Once the folder-ticket-associated session ticket acquisition request is received, the document management server 10 creates the folder-ticket-associated session ticket in response to the folder-ticket-associated session ticket acquisition request and holds the folder-ticket-associated session ticket.

FIG. 6 is a program showing an example of the session ticket acquisition request.

As shown in FIG. 6, the session ticket acquisition request includes tags <userid></userid>, <password></password>, <timeLimit></timeLimit> and others. A user ID is included in the tag <userid></userid>, a password is in the tag <password></password>, and the effective duration is in the tag <timeLimit></timeLimit> in units of seconds.

The client A transmits the session ticket acquisition request shown in FIG. 6 to the document management server 10.

FIG. 7 is a program showing an example of the session ticket acquisition response.

As shown in FIG. 7, the tag <returnValue></returnValue> in the session ticket acquisition response holds the session ticket.

As described above, the document management server 10 creates contents of the session ticket and the session ticket ID in response to the session ticket acquisition request, and sends the session ticket acquisition response, which includes the session ticket ID to represent the session ticket, to the client A.

FIG. 8 is a program showing an example of the folder ticket acquisition request.

As shown in FIG. 8, the tag <sessionid></sessionid> in the folder ticket acquisition response includes the session ticket, and the tag <folderId></folderId> in the folder ticket acquisition response includes the folder ID of the document management server 10.

The client A sends the folder ticket acquisition request to the document management server 10, which includes the session ticket obtained in the session ticket acquisition response shown in FIG. 7 and the folder ID desired to be permitted.

FIG. 9 is a program showing an example of the folder ticket acquisition response.

As shown in FIG. 9, the tag <returnValue></returnValue> in the folder ticket acquisition response holds the folder ticket.

The document management server 10 creates contents of the folder ticket and the folder ticket ID in response to the folder ticket acquisition request, and sends the folder ticket acquisition response, which includes the folder ticket ID to represent the folder ticket, to the client A.

The document management server 10, in response to the folder ticket acquisition request from the client, can transmit the folder ticket that permits usage of the folder to the client that made the request.

FIG. 10 is a program showing an example of the document storage information request.

As shown in FIG. 10, in the document storage information request, the tag <ticket></ticket> includes the folder ticket obtained by the client A from the folder ticket acquisition response in FIG. 9, and the tag <targetUrl></targetUrl> includes the URL of the document management server 10.

The client A sends the document storage information request shown in FIG. 10 to the client B. In the document storage information request shown in FIG. 10, for example, the client B is a scanner.

Further, the document storage information request shown in FIG. 10 may also include layer structure information of folders in the document management server 10.

FIG. 11 is a program showing an example of the document storage information response.

Once the client B receives the document storage information request as shown in FIG. 10 from client A, the client B sends the document storage information response illustrated in FIG. 11 to the client A.

FIG. 12 is a program showing an example of the folder-ticket-associated session ticket acquisition request.

As shown in FIG. 12, in the folder-ticket-associated session ticket acquisition request, the tag <ticket></ticket> includes the folder ticket obtained by the client A, and the tag <timeLimit></timeLimit> includes the effective duration of the folder-ticket-associated session ticket.

The client B sends the folder-ticket-associated session ticket acquisition request to the document management server 10.

FIG. 13 is a program showing an example of the folder-ticket-associated session ticket acquisition response.

As shown in FIG. 13, in the folder-ticket-associated session ticket acquisition response, the tag <returnValue></returnValue> includes the folder-ticket-associated session ticket.

The document management server 10 creates contents of the folder-ticket-associated session ticket and the -ticket-associated session ticket ID in response to the folder-ticket-associated session ticket acquisition request, and sends the folder-ticket-associated session ticket acquisition response, which includes the folder-ticket-associated session ticket ID to represent the folder-ticket-associated session ticket, to the client B.

FIG. 14 is a program showing an example of the folder-ticket-associated folder ID acquisition request.

As shown in FIG. 14, in the folder-ticket-associated folder ID acquisition request, the tag <sessionid></sessionid> includes the folder-ticket-associated folder ID, and the tag <ticket></ticket> includes the folder ticket obtained by the client A.

The client B sends the folder-ticket-associated folder ID acquisition request as shown in FIG. 14 to the document management server 10.

FIG. 15 is a program showing an example of the folder-ticket-associated folder ID acquisition response.

As shown in FIG. 15, in the folder-ticket-associated folder ID acquisition response, the tag <returnValue></returnValue> includes the folder ID.

The document management server 10 obtains the folder ID from the folder ticket as shown in FIG. 4 in response to the folder-ticket-associated folder ID acquisition request, and sends the folder-ticket-associated folder ID acquisition response, which includes the folder ID, to the client B.

FIG. 16 is a program showing an example of the document storage request.

As shown in FIG. 16, in the document storage request, the tag <sessionid></sessionid> includes the folder-ticket-associated session ticket obtained in FIG. 13, the tag <title></title> includes the title of the document stored in the folder of the document management server 10, the tag <content></content> includes the content of the document stored in the folder of the document management server 10, and the tag <creator></creator> includes the name of the user who cerates the document.

The client B sends the document storage request as shown in FIG. 16 to the document management server 10.

Further, the document storage request as shown in FIG. 16 may also include layer structure information of folders in the document management server 10, and thereby, for example, the document management server 10 can create a sub-folder below the specified folder, and store the document therein.

FIG. 17 is a program showing an example of the document storage response.

As shown in FIG. 17, in the document storage response, the tag <returnValue></returnValue> includes the document ID for identifying the stored document.

After storing the specified document to the specified folder, the document management server 10 sends the document storage response, which includes the document ID for identifying the stored document, to the client B in response to the document storage request as shown in FIG. 16.

FIG. 18 is a program showing an example of the document list acquisition request.

As shown in FIG. 18, in the document list acquisition request, the tag <sessionid></sessionid> includes the folder-ticket-associated session ticket obtained by the client B as shown in FIG. 13.

The client A may obtain the folder-ticket-associated session ticket from the document management server 10 in the same manner as steps S16 and S17 illustrated in FIG. 2.

The tag <folderId></folderId> includes the folder ID for identifying folders in the document management server 10.

The client A sends the document list acquisition request as shown in FIG. 18 to the document management server 10.

FIG. 19 is a program showing an example of the document list acquisition response.

As shown in FIG. 19, in the document list acquisition response, the tag <identifier></identifier> includes a document ID for identifying a document, the tag <title></title> includes a title of the document, and the tag <creator></creator> includes the name of the user who cerates the document.

In response to the document list acquisition request as shown in FIG. 18, the document management server 10 sends the document list acquisition response, which includes a list of the documents stored in the specified folder, to the client A.

The document management server 10 may also send the document list to a client in response to a request from the client.

FIG. 20 is a program showing an example of the document content acquisition request.

As shown in FIG. 20, in the document content acquisition request, the tag <sessionid></sessionid> includes the folder-ticket-associated session ticket obtained by the client B as shown in FIG. 13.

As described with reference to FIG. 18, the client A may obtain the folder-ticket-associated session ticket from the document management server 10 in the same manner as steps S16 and S17 illustrated in FIG. 2.

The tag <docId></docId> includes the document ID for identifying a document.

The client A sends the document content acquisition request as shown in FIG. 20 to the document management server 10.

FIG. 21 is a program showing an example of the document content acquisition response.

As shown in FIG. 21, in the document content acquisition response, the tag <returnValue></returnValue> includes the contents of the document.

In response to the document content acquisition request as shown in FIG. 20, the document management server 10 sends the document content acquisition response, which includes the contents of the specified document stored in the specified folder, to the client A.

The document management server 10 may also send the contents of the document to a client in response to a request from the client.

Below, the operation of document storage in the document management server 10 is described with reference to FIG. 22.

Figure 22:
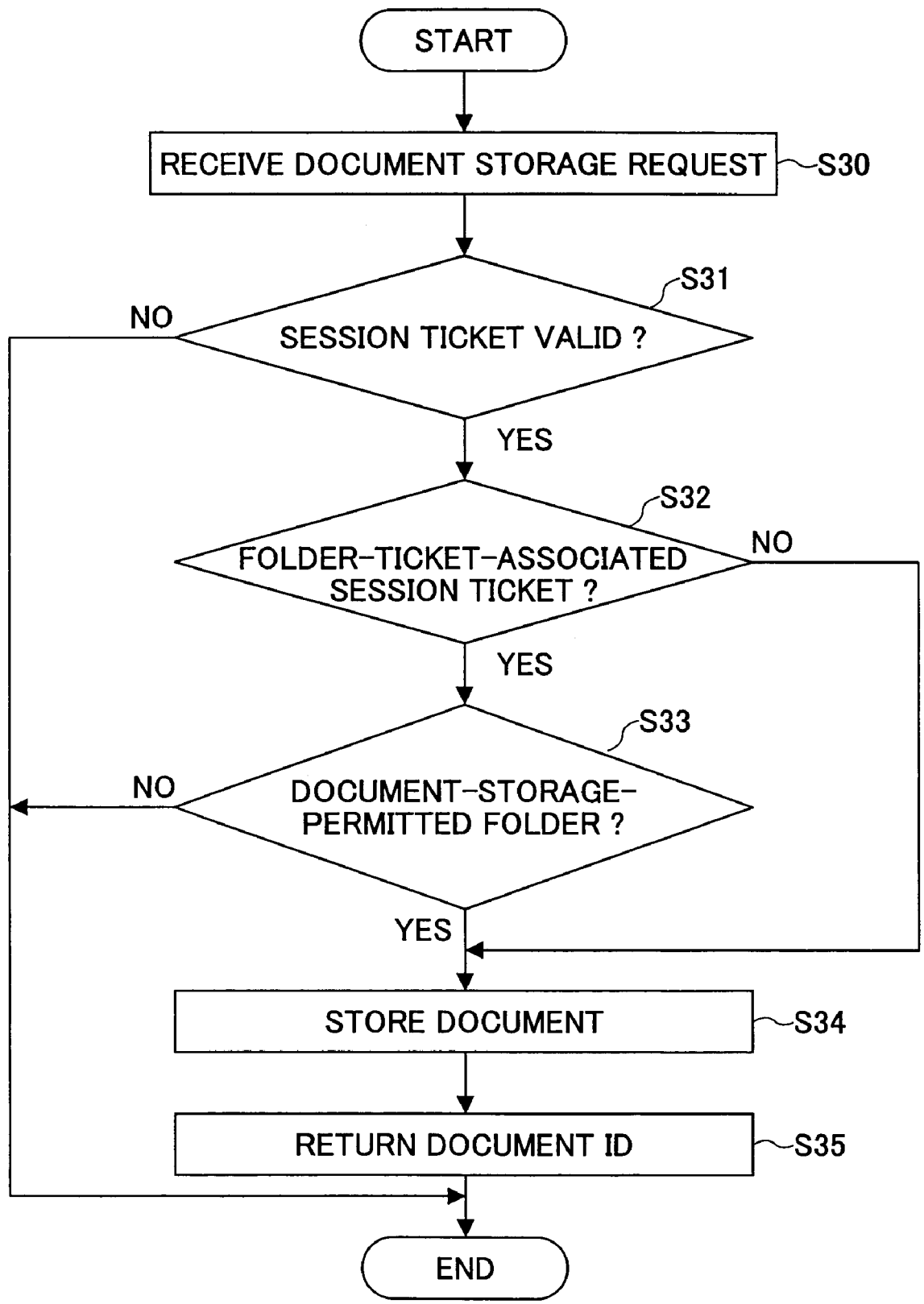
FIG. 22 is a flowchart showing an example of an operation of document storage in the document management server 10.

FIG. 22 is a flowchart showing an example of the operation of document storage in the document management server 10.

In step S30, the document management server 10 receives the document storage request as shown in FIG. 16 from a client.

Next, in step S31, the document management server 10 determines whether the session ticket included in the document storage request received in step S30 is a valid one.

If the document management server 10 determines that the session ticket is a valid one, the routine proceeds to step S32, otherwise, the routine is terminated.

For example, the document management server 10 determines the validity of the session ticket by comparing the session ticket held in the document management server 10 and the session ticket included in the document storage request received in step S30.

In step S32, the document management server 10 determines whether the session ticket included in the document storage request received in step S30 is a folder-ticket-associated session ticket, that is, whether the session ticket is included in the document storage request together with a folder ticket.

If the document management server 10 determines that the session ticket is a folder-ticket-associated session ticket, the routine proceeds to step S33, otherwise, the routine proceeds to step S34.

For example, by referring to the content of the session ticket as shown in FIG. 5, the document management server 10 confirms whether a folder ticket ID is included in the document storage request received in step S30, and thereby determining whether the session ticket included in the document storage request received in step S30 is a folder-ticket-associated session ticket.

In step S33, the document management server 10 determines whether the folder corresponding to the folder ID included in the document storage request received in step S30 is a folder to which document storage by using the folder ticket is permitted.

If the document management server 10 determines that the specified folder is a document-storage-permitted folder, the routine proceeds to step S34, otherwise, the routine stops.

For example, the document management server 10 compares the folder ID included in the received document storage request with the folder ticket as shown in FIG. 4, which corresponds to the folder ticket ID included in the session ticket shown in FIG. 5, and determines whether the folder corresponding to the folder ID included in the received document storage request is a document-storage-permitted folder.

In step S34, the document management server 10 stores the document specified by the received document storage request in the specified folder.

In step S35, the document management server 10 sends the document storage response, which includes the document ID for identifying the stored document, as shown in FIG. 17, to the client that made the document storage request.

<Time Limit>

Below, a folder ticket with a time limit is explained with reference to FIG. 23 through FIG. 25.

FIG. 23 is a program showing a second example of the folder ticket acquisition request.

In the folder ticket acquisition request shown in FIG. 23, comparing with that in FIG. 8, there is an additional tag <timeLimit></timeLimit>, and the time limit of the folder ticket is given by the tag <timeLimit></timeLimit>.

Figures 24, 25:
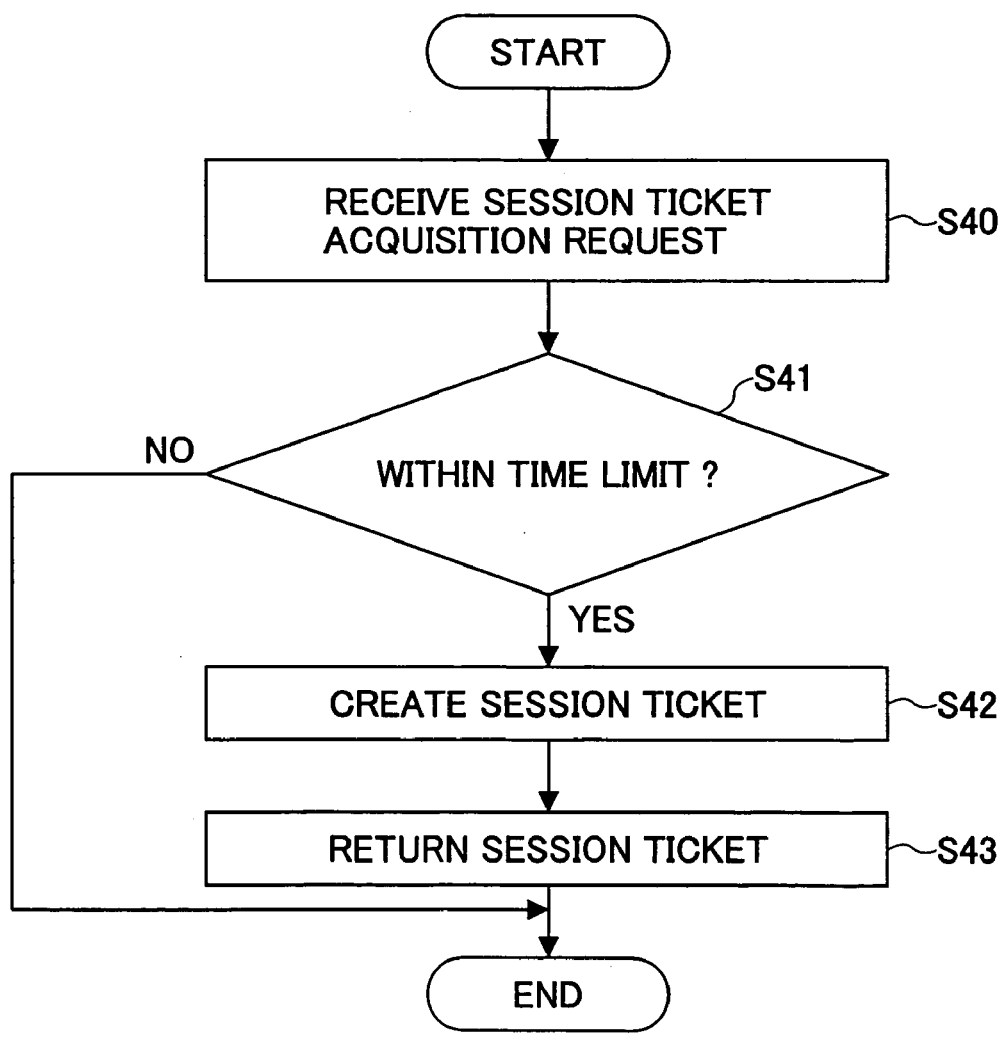
FIG. 24 is a table showing a second example of the folder ticket.
FIG. 25 is a flowchart showing an example of an operation of time limit confirmation by a folder ticket at the starting time of a session.

FIG. 24 is a table showing a second example of the folder ticket.

In the folder ticket shown in FIG. 24, comparing with that in FIG. 4, there is also an item of time limit. By incorporating the time limit into the folder ticket, it is possible to set the time limit of the folder ticket, and this improves security of the document management method and the document management server 10.

FIG. 25 is a flowchart showing an example of the operation of time limit confirmation at the beginning of the folder-ticket-associated session.

In step S40, the document management server 10 receives the folder-ticket-associated session ticket acquisition request, as shown in FIG. 12, from a client.

Next, in step S41, the document management server 10 determines whether the folder ticket included in the folder-ticket-associated session ticket acquisition request received in step S40 is within the time limit.

If the document management server 10 determines that the folder ticket is within the time limit, the routine proceeds to step S42, and if the folder ticket is not within the time limit, the routine is terminated.

For example, by referring to the content of the folder ticket as shown in FIG. 24, the document management server 10 finds the time limit in the folder ticket included in the folder-ticket-associated session ticket acquisition request received in step S40, and determines whether the folder ticket received in step S40 is within the time limit.

In step S42, the document management server 10 creates the content of the session ticket and identification information as shown in FIG. 5, and holds the session ticket.

Next, in step S43, by using the session ticket ID created in step S42 as the session ticket, the document management server 10 sends the folder-ticket-associated session ticket acquisition response including the session ticket, as shown in FIG. 13, to the client that made the folder-ticket-associated session ticket acquisition request.

When the document management server 10 receives the folder-ticket-associated session ticket acquisition request, by confirming the time limit of the folder ticket, it is possible to forbid usage of the expired folders, and this improves security of the document management method and the document management server 10.

Alternatively, as shown in FIG. 25, When the document management server 10 receives the folder-ticket-associated session ticket acquisition request, the document management server 10 may constantly monitor the folders and check the presence of expired folders instead of checking the time limit directly, and thereby forbidding usage of the expired folders.

With the above configuration, it is not necessary to manage the folders out of the time limit.

<Connection Limit>

Below, a folder ticket with a limit number of connections is explained with reference to FIG. 26 through FIG. 28.

FIG. 26 is a program showing a third example of the folder ticket acquisition request.

In the folder ticket acquisition request shown in FIG. 26, comparing with that in FIG. 8, there is an additional tag <entryCount></entryCount>, which specifies the limit number of connections between a client and the document management server 10 by using the folder ticket.

Figures 27, 28:
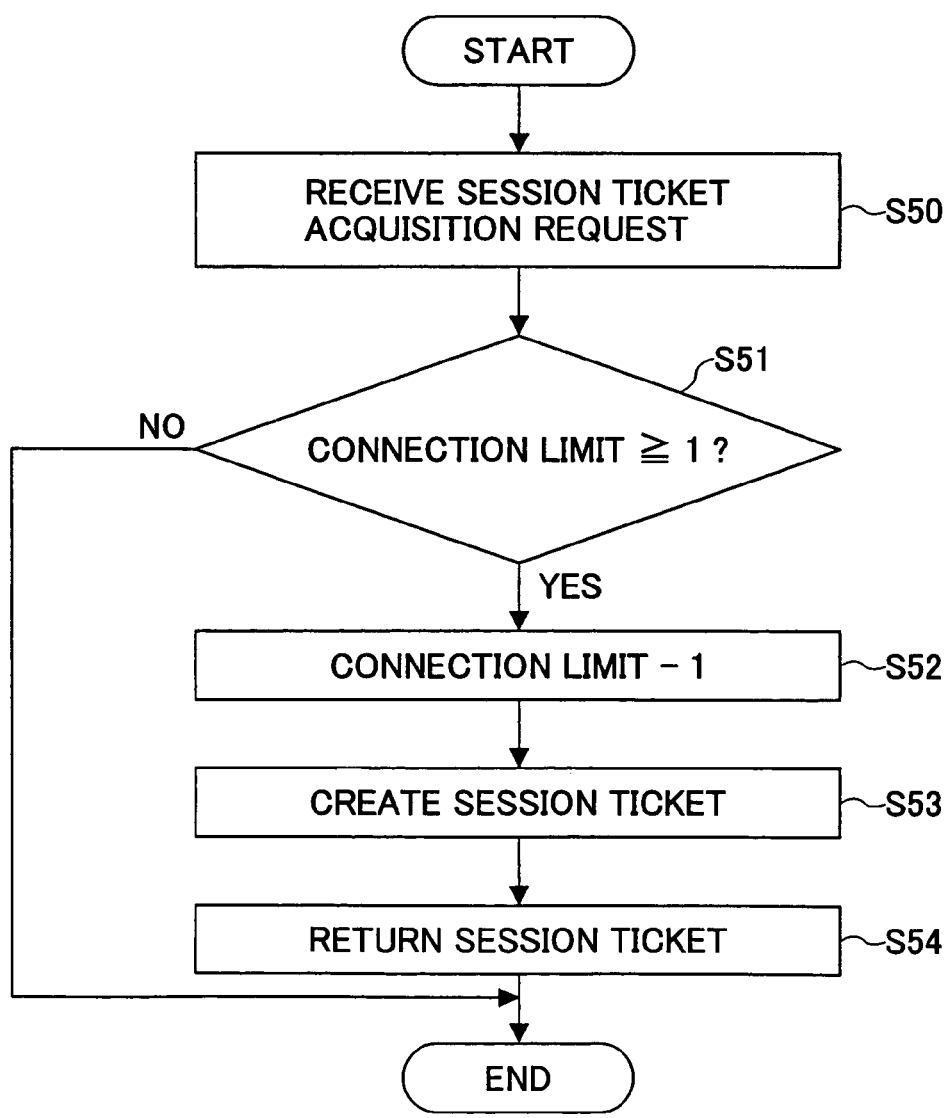
FIG. 27 is a table showing a third example of the folder ticket.
FIG. 28 is a flowchart showing an example of an operation of confirmation of the limit number of connections at the beginning of the folder-ticket-associated session.

FIG. 27 is a table showing a third example of the folder ticket.

In the folder ticket shown in FIG. 27, comparing with that in FIG. 4, there is an item of connection limit indicating the limit number of connections between a client and the document management server 10. By incorporating the item of limit number of connections into the folder ticket, it is possible to limit the number of connections, and this improves security of the document management method and the document management server 10.

FIG. 28 is a flowchart showing an example of the operation of confirmation of the limit number of connections at the beginning of the folder-ticket-associated session.

In step S50, the document management server 10 receives the folder-ticket-associated session ticket acquisition request as shown in FIG. 12 from a client.

Next, in step S51, the document management server 10 determines whether the limit number of connections between the client and the document management server 10 by using the folder ticket, which is included in the folder-ticket-associated session ticket acquisition request received in step S50, is equal to or greater than one.

If the document management server 10 determines that the limit number of connections is equal to or greater than one, the routine proceeds to step S52, otherwise, the routine is terminated.

For example, by referring to the contents of the folder ticket shown in FIG. 27, the document management server 10 finds the limit number of connections included in the folder-ticket-associated session ticket acquisition request received in step S50, and determines whether the limit number of connections received in step S50 is equal to or greater than one.

In step S52, the document management server 10 decreases the limit number of connections by one, which is included in the folder-ticket-associated session ticket acquisition request received in step S50.

Next, in step S53, the document management server 10 creates the content of the session ticket and identification information as shown in FIG. 5, and holds the session ticket.

Next, in step S54, by using the session ticket ID created in step S53 as the session ticket, the document management server 10 sends the folder-ticket-associated session ticket acquisition response including the session ticket, as shown in FIG. 13, to the client that made the folder-ticket-associated session ticket acquisition request.

When the document management server 10 receives the folder-ticket-associated session ticket acquisition request, by confirming the limit number of connections between a client and the document management server 10 by using the folder ticket, it is possible to forbid usage of the folders that have been connected for a number of times over the limit number, and this improves security of the document management method and the document management server 10.

<Document Storage Limit>

Below, a folder ticket with a limit number of operations of document storage is explained with reference to FIG. 29 through FIG. 32.

FIG. 29 is a program showing a fourth example of the folder ticket acquisition request.

In the folder ticket acquisition request shown in FIG. 29, comparing with that in FIG. 8, there is an additional tag <putDocCount></putDocCount>, which specifies the limit number of operations of document storage in a folder in the document management server 10.

FIG. 30 is a table showing a fourth example of the folder ticket.

In the folder ticket shown in FIG. 30, comparing with that in FIG. 4, there is an item of storage operation limit indicating the limit number of operations of document storage in a folder in the document management server 10. By incorporating the item of the number of document storage operations into the folder ticket, it is possible to limit the number of operations of document storage in a folder in the document management server 10, and this improves security of the document management method and the document management server 10.

FIG. 31 is a table showing a second example of the folder-ticket-associated session ticket.

The folder-ticket-associated session ticket shown in FIG. 31, which is the same as that in FIG. 5, includes a session ticket ID and a folder ticket ID, but the folder ticket corresponding to the folder ticket ID in FIG. 31, as that shown in FIG. 30, includes the limit number of operations of document storage in a folder in the document management server 10.

Figure 32:
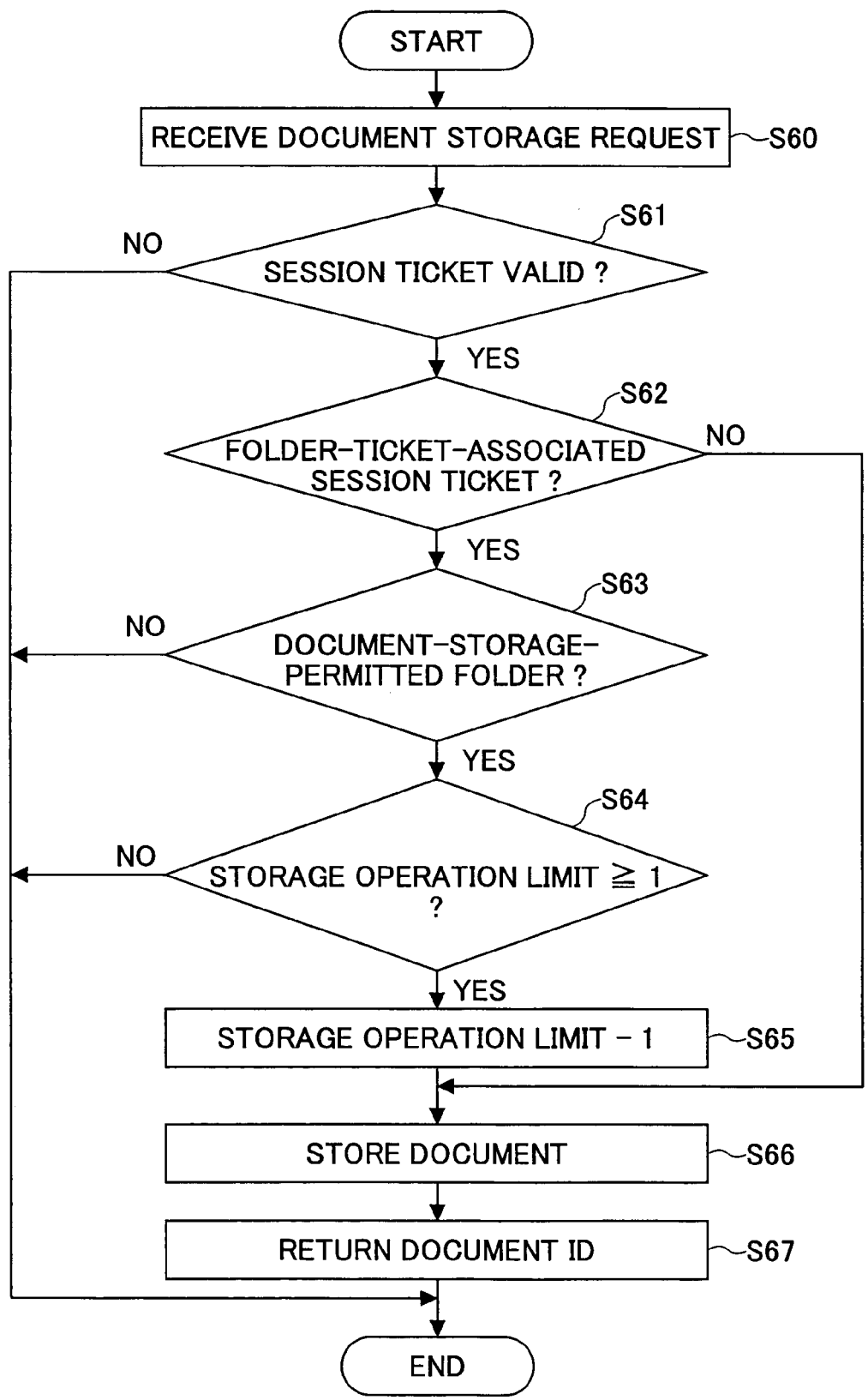
FIG. 32 is a flowchart showing an example of the operation of confirmation of the document storage limit when storing a document in a folder in the document management server 10.

FIG. 32 is a flowchart showing an example of the operation of confirmation of the limit number of the document storage operations when storing a document in a folder in the document management server 10.

In step S60, the document management server 10 receives the document storage request as shown in FIG. 16 from a client.

Next, in step S61, the document management server 10 determines whether the session ticket included in the document storage request received in step S60 is a valid one.

If the document management server 10 determines that the session ticket is a valid one, the routine proceeds to step S62, otherwise, the routine is terminated.

For example, the document management server 10 determines the validity of the session ticket by comparing the session ticket held in the document management server 10 and the session ticket included in the document storage request received in step S60.

In step S62, the document management server 10 determines whether the session ticket included in the document storage request received in step S60 is a folder-ticket-associated session ticket, that is, whether the session ticket is included in the document storage request together with a folder ticket.

If the document management server 10 determines that the session ticket is a folder-ticket-associated session ticket, the routine proceeds to step S63, otherwise, the routine proceeds to step S66.

For example, by referring to the content of the session ticket as shown in FIG. 31, the document management server 10 confirms whether a folder ticket ID is included in the document storage request received in step S60, and determines whether the session ticket included in the document storage request received in step S60 is a folder-ticket-associated session ticket.

In step S63, the document management server 10 determines whether the folder corresponding to the folder ID included in the document storage request received in step S60 is a folder to which document storage by using the folder ticket is permitted.

If the document management server 10 determines that the specified folder is a document-storage-permitted folder, the routine proceeds to step S64, otherwise, the routine stops.

For example, the document management server 10 compares the folder ID included in the received document storage request with the folder ticket as shown in FIG. 30, which corresponds to the folder ticket ID included in the session ticket shown in FIG. 31, and determines whether the folder corresponding to the folder ID included in the received document storage request is a document-storage-permitted folder.

In step S64, the document management server 10 determines whether the limit number of the document storage operations included in the folder ticket as shown in FIG. 30 is equal to or greater than one.

If the document management server 10 determines that the limit number of the document storage operations is equal to or greater than one, the routine proceeds to step S65, otherwise, the routine is terminated.

For example, by referring to the contents of the session ticket shown in FIG. 31, the document management server 10 finds the folder ticket ID received in step S60, then by referring to the contents of the folder ticket shown in FIG. 30, the document management server 10 finds the limit number of the document storage operations received in step S60 and determines whether the received limit number of document storage operations is equal to or greater than one.

In step S65, the document management server 10 decreases the limit number of the document storage operations included in the folder ticket as shown in FIG. 30 by one.

In step S66, the document management server 10 stores the document specified by the received document storage request in the specified folder.

In step S67, the document management server 10 sends the document storage response including the document ID for identifying the stored document, as shown in FIG. 17, to the client that made the document storage request.

When the document management server 10 receives the document storage request, by confirming the limit number of operations of document storage in a folder of the document management server 10, it is possible to forbid usage of folders whose assigned number of document storage operations has been used up, and this improves security of the document management method and the document management server 10.

It should be noted that although FIG. 32 illustrates the operation of confirming the limit number of the document storage operations when storing a document in a folder, when the folder ticket permits rewriting or deleting documents stored in the folder, and when a request of rewriting or deleting documents is received from a client, the document management server 10 operates in the same way as shown in FIG. 32, except that the step S65 is not needed.

<Storage Capacity Limit>

Below, a folder ticket with a limit of the storage capacity is explained with reference to FIG. 33 through FIG. 36.

FIG. 33 is a program showing a fifth example of the folder ticket acquisition request.

In the folder ticket acquisition request shown in FIG. 33, comparing with that in FIG. 8, there is an additional tag <putDocCapacity></putDocCapacity>, which specifies the limit storage capacity of a folder of the document management server 10.

FIG. 34 is a table showing a fifth example of the folder ticket.

In the folder ticket shown in FIG. 34, comparing with that in FIG. 4, there is an item of storage capacity limit of a folder of the document management server 10 in units of MB (Megabyte). By incorporating the item of the storage capacity limit into the folder ticket, it is possible to limit the amount of the documents stored in a folder in the document management server 10, and this improves security of the document management method and the document management server 10.

FIG. 35 is a table showing a third example of the folder-ticket-associated session ticket.

The folder-ticket-associated session ticket shown in FIG. 35, which is the same as that in FIG. 5, includes a session ticket ID and a folder ticket ID, but the folder ticket corresponding to the folder ticket ID in FIG. 35, as that shown in FIG. 34, includes the storage capacity limit of a folder in the document management server 10.

Figure 36:
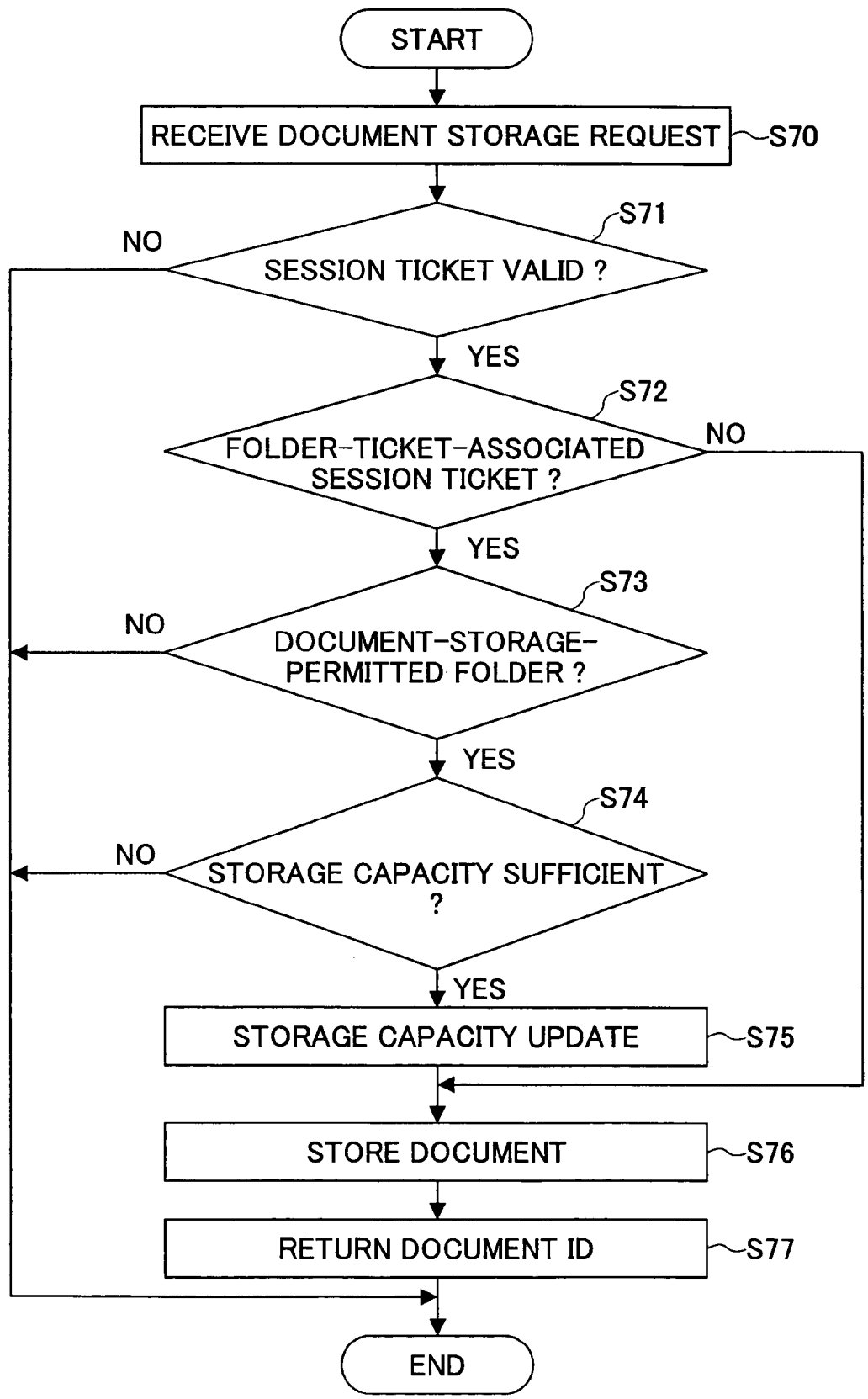
FIG. 36 is a flowchart showing an example of the operation of confirmation of the storage capacity limit when storing a document in a folder in the document management server 10.

FIG. 36 is a flowchart showing an example of the operation of confirmation of the storage capacity limit when storing a document in a folder in the document management server 10.

In step S70, the document management server 10 receives the document storage request as shown in FIG. 16 from a client.

Next, in step S71, the document management server 10 determines whether the session ticket included in the document storage request received in step S70 is a valid one.

If the document management server 10 determines that the session ticket is a valid one, the routine proceeds to step S72, otherwise, the routine is terminated.

For example, the document management server 10 determines the validity of the session ticket by comparing the session ticket held in the document management server 10 and the session ticket included in the document storage request received in step S70.

In step S72, the document management server 10 determines whether the session ticket included in the document storage request received in step S70 is a folder-ticket-associated session ticket, that is, whether the session ticket is included in the document storage request together with a folder ticket.

If the document management server 10 determines that the session ticket is a folder-ticket-associated session ticket, the routine proceeds to step S73, otherwise, the routine proceeds to step S76.

For example, by referring to the content of the session ticket as shown in FIG. 35, the document management server 10 confirms whether a folder ticket ID is included in the document storage request received in step S70, and determines whether the session ticket included in the document storage request received in step S70 is a folder-ticket-associated session ticket.

In step S73, the document management server 10 determines whether the folder corresponding to the folder ID included in the document storage request received in step S70 is a folder to which document storage by using the folder ticket is permitted.

If the document management server 10 determines that the specified folder is a document-storage-permitted folder, the routine proceeds to step S74, otherwise, the routine stops.

For example, the document management server 10 compares the folder ID included in the received document storage request with the folder ticket as shown in FIG. 34, which corresponds to the folder ticket ID included in the session ticket shown in FIG. 35, and determines whether the folder corresponding to the folder ID included in the received document storage request is a document-storage-permitted folder.

In step S74, the document management server 10 determines whether the difference between the storage capacity limit included in the folder ticket as shown in FIG. 34 and the requested storage capacity included in the document storage request received in step S70 is greater than zero.

If the document management server 10 determines that the difference is greater than zero, the routine proceeds to step S75, otherwise, the routine is terminated.

In step S75, the document management server 10 subtracts the requested storage capacity included in the document storage request received in step S70 from the storage capacity limit included in the folder ticket as shown in FIG. 34.

In step S76, the document management server 10 stores the document specified by the received document storage request in the folder specified by the document storage request.

In step S77, the document management server 10 sends the document storage response including the document ID for identifying the stored document, as shown in FIG. 17, to the client that made the document storage request.

When the document management server 10 receives the document storage request, by confirming the document storage capacity limit of a folder in the document management server 10, it is possible to forbid usage of folders whose assigned storage capacity has been used up, and this improves security of the document management method and the document management server 10.

<Multiple Folders>

Below, a folder ticket with folder IDs of a number of folders is explained with reference to FIG. 37 and FIG. 38.

FIG. 37 is a program showing a sixth example of the folder ticket acquisition request.

In FIG. 37, the argument of the variable "getFolderTicket" in the folder ticket acquisition request is an array of character strings, while in FIG. 8, the argument of the variable "getFolderTicket" in the folder ticket acquisition request is a single character string.

In FIG. 37, in the tag <folderId></folderId>, there are a series of tags <item></item>, and each of the tags <item></item> includes a folder ID for identifying one of the folders operable by referring to the folder ticket.

Figures 38, 39:
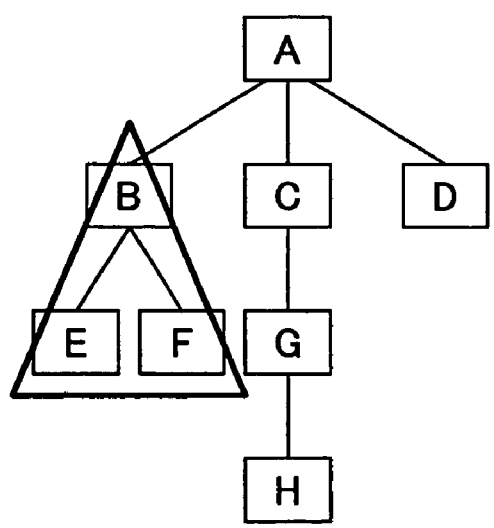
FIG. 38 is a table showing a sixth example of the folder ticket.
FIG. 39 is a schematic view showing an example of a layer structure of a folder.

FIG. 38 is a table showing a sixth example of the folder ticket.

In the folder ticket shown in FIG. 38, comparing with that in FIG. 4, there are more than one folder ID for identifying more than one folder operable by referring to the folder ticket.

By incorporating more than one folder IDs for identifying more than one folder that are operable by referring to the folder ticket, the document management server 10 can use more than one folder with only one folder ticket.

<Sub-folder Usage Permission>

In the above, it is described that the document management server 10 creates a folder ticket and permits storage of documents in a usage-permitted folder or permit edition of documents stored in the folder.

Below, with reference to FIG. 39 and FIG. 40, an explanation is made of a case in which the document management server 10 permits usage of sub-folders of a usage-permitted folder.

FIG. 39 is a schematic view showing an example of a layer structure of a folder.

As shown in FIG. 39, a root folder A has a sub-folder B, a sub-folder C, and a sub-folder D, which are one-layer lower than the root folder A.

The folder B has a sub-folder E and a sub-folder F, which are one-layer lower than the folder B.

The folder C has a sub-folder G which is one-layer lower than the folder C. Further, the folder G has a sub-folder H which is one-layer lower than the folder G.

As described below, if the document management server 10 creates a folder ticket and permits a client to use the folder B, as long as the folder ticket is valid, not only the folder B, but also its sub-folders, that is, the folder E and folder F, can be used.

Figure 40:
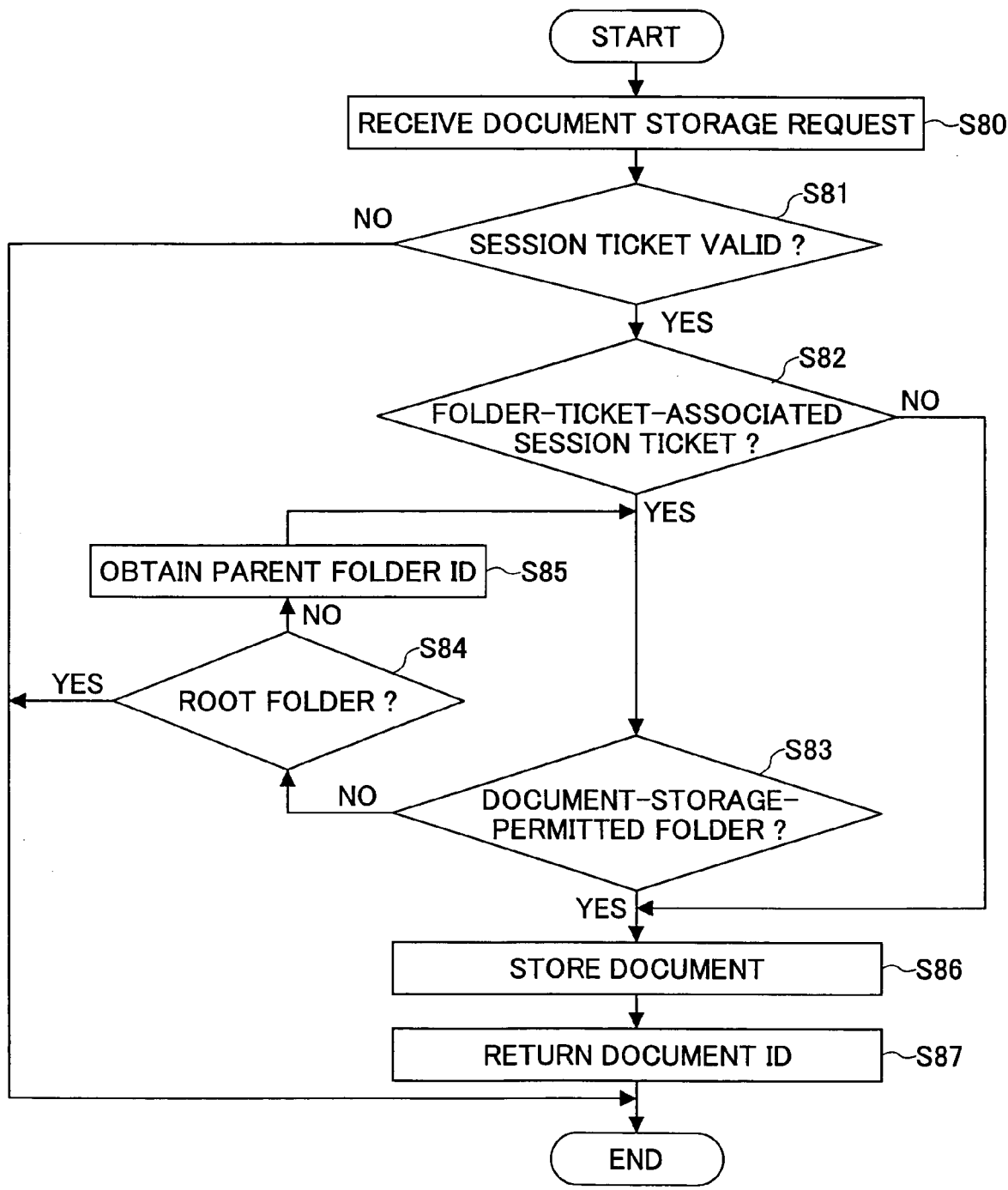
FIG. 40 is a flowchart showing a second example of the operation of document storage in the document management server 10.

FIG. 40 is a flowchart showing a second example of the operation of document storage in the document management server 10.

In step S80, the document management server 10 receives the document storage request as shown in FIG. 16 from a client.

Next, in step S81, the document management server 10 determines whether the session ticket included in the document storage request received in step S80 is a valid one.

If the document management server 10 determines that the session ticket is a valid one, the routine proceeds to step S82, otherwise, the routine is terminated.

For example, the document management server 10 determines the validity of the session ticket by comparing the session ticket held in the document management server 10 and the session ticket included in the document storage request received in step S80.

In step S82, the document management server 10 determines whether the session ticket included in the document storage request received in step S80 is a folder-ticket-associated session ticket, that is, whether the session ticket is included in the document storage request together with a folder ticket.

If the document management server 10 determines that the session ticket is a folder-ticket-associated session ticket, the routine proceeds to step S83, otherwise, the routine proceeds to step S86.

For example, by referring to the content of the session ticket as shown in FIG. 5, the document management server 10 confirms whether a folder ticket ID is included in the document storage request received in step S80, and thereby determining whether the session ticket included in the document storage request received in step S80 is a folder-ticket-associated session ticket.

In step S83, the document management server 10 determines whether the folder corresponding to the folder ID included in the document storage request received in step S80 is a folder to which document storage by using the folder ticket is permitted.

If the document management server 10 determines that the specified folder is a document-storage-permitted folder, the routine proceeds to step S86, otherwise, to step S84.

For example, the document management server 10 compares the folder ID included in the received document storage request with the folder ticket as shown in FIG. 4, which corresponds to the folder ticket ID included in the session ticket shown in FIG. 5, and determines whether the folder corresponding to the folder ID included in the received document storage request is a document-storage-permitted folder.

In step S84, the document management server 10 determines whether the folder corresponding to the specified folder ID is a root folder.

If the document management server 10 determines the specified folder is a root folder, the routine stops, otherwise, the routine proceeds to step S85.

In step S85, the document management server 10 obtains the ID of the parent folder of the folder corresponding to the specified folder ID, and proceeds to step S83, and repeats.

In step S86, the document management server 10 stores the document specified by the received document storage request in the specified folder.

In step S87, the document management server 10 sends the document storage response, which includes the document ID for identifying the stored document, as shown in FIG. 17, to the client that made the document storage request.

By the operations as shown in FIG. 40, while being able to create a folder ticket and permit document storage in a usage-permitted folder or permit edition of documents stored in the folder, it is also possible to permit document storage in a sub-folder of the usage-permitted folder or permit edition of documents stored in the sub-folder.

<Document Ticket>

It is described above that the document management server 10 creates the document storage response, as shown in FIG. 17, including a document ID for identifying a stored document in response to the document storage request, and sends the document storage response to the client that made the document storage request.

Below, with reference to FIG. 41 and FIG. 42, it is described that the document management server 10 sends a document storage response including a document ID and a document ticket that permits usage of a document to the client that made the document storage request.

Figure 41:
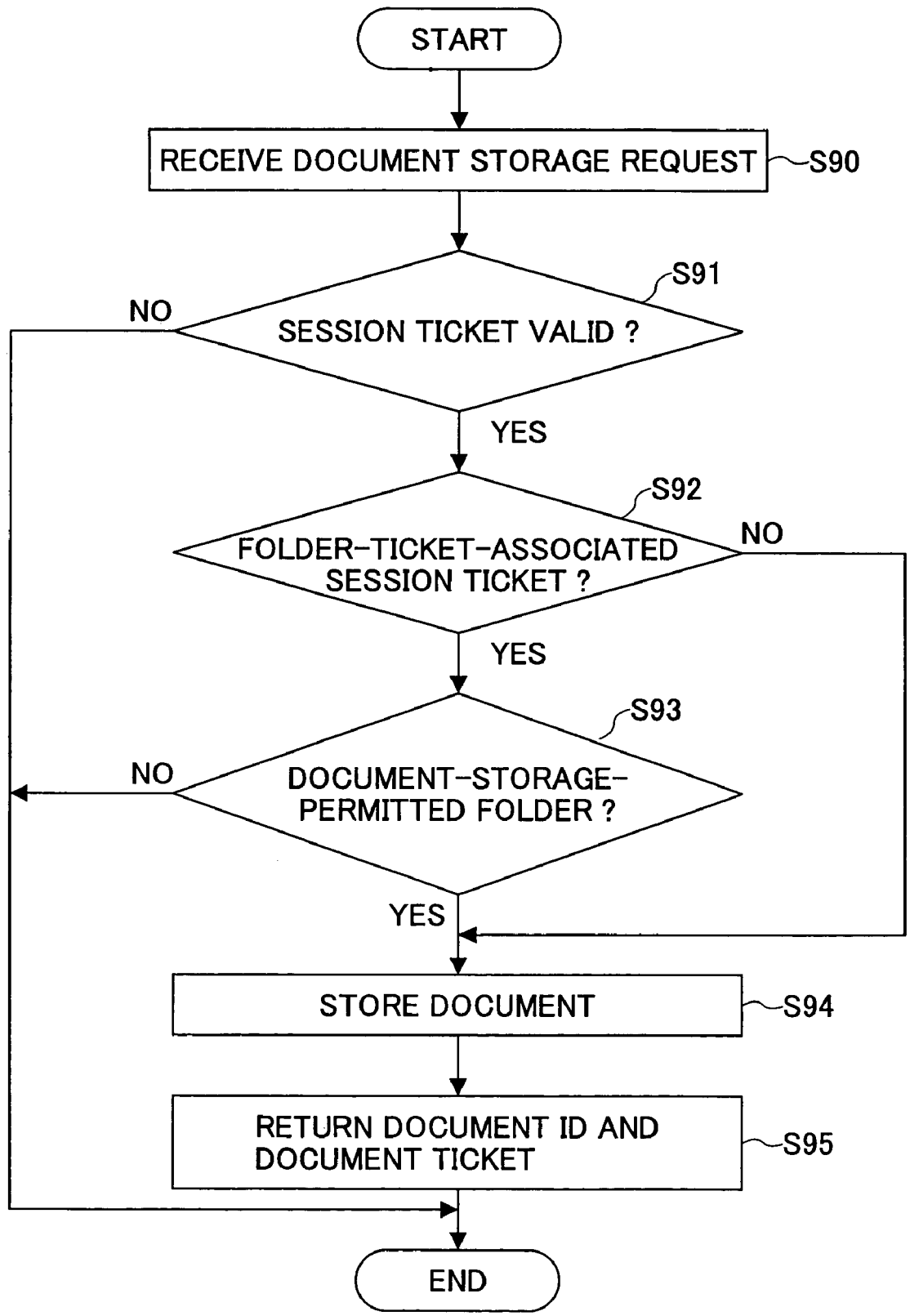
FIG. 41 is a flowchart showing a third example of the operation of document storage in the document management server 10.

FIG. 41 is a flowchart showing a third example of the operation of document storage in the document management server 10. The operations from step S90 to step S94 are the same as the operations from step S30 to step S34 shown in FIG. 22.

In step S90, the document management server 10 receives the document storage request as shown in FIG. 16 from a client.

Next, in step S91, the document management server 10 determines whether the session ticket included in the document storage request received in step S90 is a valid one.

If the document management server 10 determines that the session ticket is a valid one, the routine proceeds to step S92, otherwise, the routine is terminated.

For example, the document management server 10 determines the validity of the session ticket by comparing the session ticket held in the document management server 10 and the session ticket included in the document storage request received in step S90.

In step S92, the document management server 10 determines whether the session ticket included in the document storage request received in step S90 is a folder-ticket-associated session ticket, that is, whether the session ticket is included in the document storage request together with a folder ticket.

If the document management server 10 determines that the session ticket is a folder-ticket-associated session ticket, the routine proceeds to step S93, otherwise, the routine proceeds to step S94.

For example, by referring to the content of the session ticket as shown in FIG. 5, the document management server 10 confirms whether a folder ticket ID is included in the document storage request received in step S90, and thereby determining whether the session ticket included in the document storage request received in step S90 is a folder-ticket-associated session ticket.

In step S93, the document management server 10 determines whether the folder corresponding to the folder ID included in the document storage request received in step S90 is a folder to which document storage by using the folder ticket is permitted.

If the document management server 10 determines that the specified folder is a document-storage-permitted folder, the routine proceeds to step S94, otherwise, the routine stops.

For example, the document management server 10 compares the folder ID included in the received document storage request with the folder ticket as shown in FIG. 4, which corresponds to the folder ticket ID included in the session ticket shown in FIG. 5, and determines whether the folder corresponding to the folder ID included in the received document storage request is a document-storage-permitted folder.

In step S94, the document management server 10 stores the document specified by the received document storage request in the specified folder.

In step S95, the document management server 10 creates a document ticket that permits usage of a document stored in a folder, and sends a document storage response, as shown in FIG. 42 and described below, including a document ID for identifying the stored document and the document ticket to the client that made the document storage request.

Because the document management server 10 sends the document storage response including both the document ID and the document ticket to the client, the client that stores the document by using the document ticket is able to obtain the document ticket that permits usage of the document, and uses the stored document with the document ticket.

FIG. 42 is a program showing another example of the document storage response.

In the document storage response shown in FIG. 42, comparing with that in FIG. 17, there is an additional tag <docTicket></docTicket>, which holds the document ticket that permits usage of the stored document.

<Edition Privilege>

Below, with reference to FIG. 43 and FIG. 44, an explanation is made of a case in which after storing documents in a folder, the document management server 10 grants an additional edition privilege, such as rewriting or deleting, to a folder ticket having only the privilege of documents storage in the folder.

Figure 43:
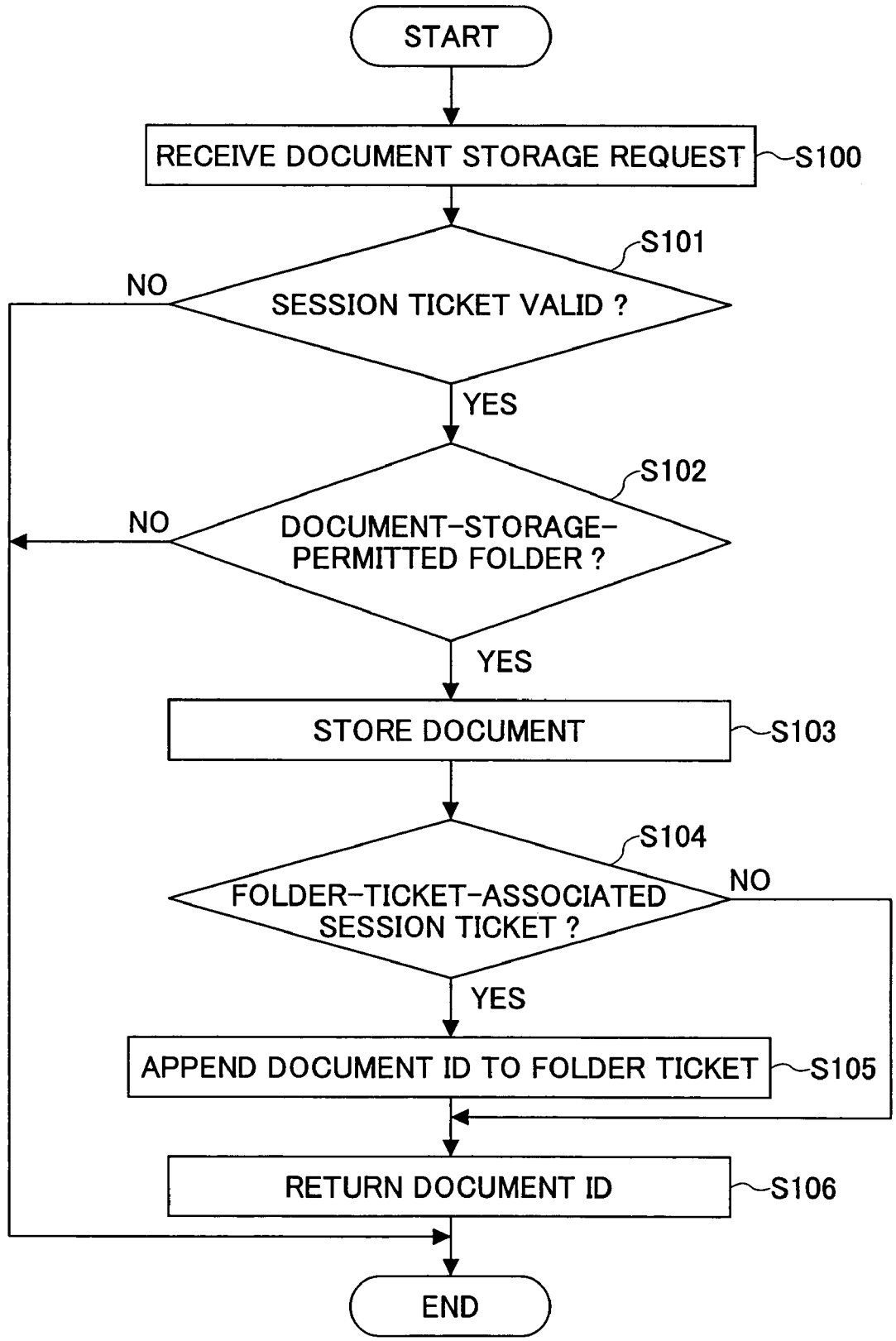
FIG. 43 is a flowchart showing a fourth example of the operation of document storage in the document management server 10.

FIG. 43 is a flowchart showing a fourth example of the operation of document storage in the document management server 10.

In step S100, the document management server 10 receives the document storage request as shown in FIG. 16 from a client.

Next, in step S101, the document management server 10 determines whether the session ticket included in the document storage request received in step S100 is a valid one.

If the document management server 10 determines that the session ticket is a valid one, the routine proceeds to step S102, otherwise, the routine is terminated.

For example, the document management server 10 determines the validity of the session ticket by comparing the session ticket held in the document management server 10 and the session ticket included in the document storage request received in step S100.

In step S102, the document management server 10 determines whether the folder corresponding to the folder ID included in the document storage request received in step S100 is specified by the folder ticket to be a folder to which document storage is permitted.

If the document management server 10 determines that the specified folder is a document-storage-permitted folder, the routine proceeds to step S103, otherwise, the routine stops.

For example, the document management server 10 compares the folder ID included in the received document storage request with the folder ticket as shown in FIG. 4, which corresponds to the folder ticket ID included in the session ticket shown in FIG. 5, and determines whether the folder corresponding to the folder ID included in the received document storage request is a document-storage-permitted folder by using the folder ticket.

In step S103, the document management server 10 stores the document specified by the received document storage request in the specified folder.

In step S104, the document management server 10 determines whether the session ticket included in the document storage request received in step S130 is a folder-ticket-associated session ticket, that is, whether the session ticket is included in the document storage request together with a folder ticket.

If the document management server 10 determines that the session ticket is a folder-ticket-associated session ticket, the routine proceeds to step S105, otherwise, the routine proceeds to step S106.

For example, by referring to the content of the session ticket as shown in FIG. 5, the document management server 10 confirms whether a folder ticket ID is included in the document storage request received in step S100, and thereby determining whether the session ticket included in the document storage request received in step S100 is a folder-ticket-associated session ticket.

In step S105, the document management server 10 appends the document ID for identifying the documents stored in a folder to the folder ticket with the document ID being an editable text.

In step S106, the document management server 10 sends the document storage response, which includes the document ID for identifying the stored document, as shown in FIG. 17, to the client that made the document storage request.

Because the document management server 10 appends the document ID for identifying documents stored in a folder to the folder ticket with the document ID being an editable text, the client having the folder ticket is capable of editing the document corresponding to the document ID.

FIG. 44 is a table showing an example of such a folder ticket.

In the folder ticket shown in FIG. 44, comparing with that in FIG. 4, there is a document ID, which is an editable text, of a stored document.

Folders mentioned in this specification correspond to UNIX (registered trademark) or MS-DOS (registered trademark) directories.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, according to the present invention, it is possible to provide a document management device and a document management method that enables usage of a usage-permitted folder while ensuring high security without imposing an additional load on a network.

This patent application is based on Japanese Priority Patent Applications No. 2003-022143 filed on Jan. 30, 2003 and No. 2004-011067 filed on Jan. 19, 2004, and the entire contents of which are hereby incorporated by reference.

What is claimed is:

1. A document management device having a document storage unit for storing a document, comprising:
   a usage permission information request reception unit configured to electronically receive a usage permission information request message from a first client, said first client being a usage permission information requesting client, said usage permission information permitting access to the document storage unit;
   a usage permission information generation unit configured to generate the usage permission information in response to the received usage permission information request message from the first client;
   a usage permission information transmission unit configured to transmit the usage permission information to the first client; and
   a document usage request reception unit configured to receive an access permission request from a second client, the second client being a usage requesting client, the access permission request including the usage permission information, the usage permission information is used to permit access to the document storage unit by the second client and is used to allow the second client to transfer a document stored in the second client directly to the document storage unit.

2. The document management device as claimed in claim 1, wherein
   the usage permission information generation unit generates the usage permission information and identification information of the usage permission information, and holds the usage permission information.

3. The document management device as claimed in claim 2, wherein
   the usage permission information transmission unit transmits the identification information to the usage permission information requesting client as the usage permission information.

4. The document management device as claimed in claim 2, wherein
   the usage permission information includes identification information of the document storage unit and authority information of the usage permission information.

5. The document management device as claimed in claim 2, wherein
   the usage permission information includes identification information of the document storage unit and effective period information of the usage permission information.

6. The document management device as claimed in claim 2, wherein
   the usage permission information includes identification information of the document storage unit and information of a maximum number of connections with the document management device.

7. The document management device as claimed in claim 2, wherein
   the usage permission information includes identification information of the document storage unit and information of a maximum number of operations of document storage in the document storage unit.

8. The document management device as claimed in claim 2, wherein
   the usage permission information includes identification information of the document storage unit and information of a storage capacity in the document storage unit.

9. The document management device as claimed in claim 2, wherein
   the usage permission information includes a plurality of items of identification information of the document storage unit.

10. The document management device as claimed in claim 1, further comprising:
    a usage request reception unit configured to receive a usage request from a usage requesting client for using the document storage unit; and
    a usage unit configured to use the document storage unit according to the usage permission information.

11. The document management device as claimed in claim 10, wherein
    the usage requesting client is different from the usage permission information requesting client.

12. The document management device as claimed in claim 10, wherein
    the usage request includes information on the document and information on the document storage unit.

13. The document management device as claimed in claim 10, wherein
    the usage unit stores the document in the document storage unit according to the usage permission information.

14. The document management device as claimed in claim 13, further comprising:
    a document identification information appending unit configured to append document identification information for identifying the stored document to the usage permission information, said document identification information being appended as editable data.

15. The document management device as claimed in claim 13, further comprising:
    a document identification information transmission unit configured to transmit document identification information for identifying the stored document to the usage requesting client.

16. The document management device as claimed in claim 13, further comprising:
    a document usage permission information transmission unit configured to transmit information for permitting usage of the stored document to the usage requesting client.

17. The document management device as claimed in claim 10, wherein
    the usage unit includes a determination unit that determines whether the document storage unit requested by the usage request is at a lower level than the document storage unit permitted for use by the usage permission information generated by the usage permission information generation unit.

18. The document management device as claimed in claim 1, further comprising:
    a document list information request reception unit configured to receive a document list information request from a document list information requesting client for acquiring document list information of at least one document stored in the document storage unit; and a document list information transmission unit configured to transmit the document list information to the document list information requesting client in response to the received document list information request.

19. The document management device as claimed in claim 1, further comprising:

a document content information request reception unit configured to receive a document content information request from a document content information requesting client for acquiring information of contents of the document stored in the document storage unit; and a document content information transmission unit configured to transmit the document content information to the document content information requesting client in response to the received document content information request.

20. The document management device as claimed in claim 1, further comprising:

a connection permission information request reception unit configured to receive a connection permission information request from a connection permission information requesting client for acquiring connection permission information that includes the usage permission information and permits connection with the document management device;

a connection permission information generation unit configured to generate the connection permission information in response to the received connection permission information request; and a connection permission information transmission unit configured to transmit the connection permission information to the connection permission information requesting client.

21. The document management device as claimed in claim 20, further comprising:

an identification information request reception unit configured to receive an identification information request, made by the connection permission information requesting client, for acquiring identification information of the document storage unit, said identification information of the document storage unit including the connection permission information and the usage permission information; and an identification information transmission unit configured to transmit the identification information to the connection permission information requesting client that requests the identification information in response to the received identification information request.

22. A method of a document management device having a document storage unit for storing a document, comprising the steps of:

receiving a usage permission information request message from a first client, said first client being a usage permission information requesting client, said usage permission information permitting access to the document storage unit;

generating the usage permission information in response to the received usage permission information request message from the first client;

transmitting the usage permission information to the first client; and receiving an access permission request from a second client, the second client being a usage requesting client, the access permission request including the usage permission information, the usage permission information is used to permit access to the document storage unit by the second client and is used to allow the second client to transfer a document stored in the second client directly to the document storage unit.

23. The method as claimed in claim 22, further comprising the steps of:

receiving a usage request from a usage requesting client for using the document storage unit; and using the document storage unit according to the usage permission information.

24. The method as claimed in claim 23, wherein the usage requesting client is different from the usage permission information requesting client that receives the usage permission information transmitted in the step of transmitting the usage permission information.

25. A computer readable storage medium encoded with a computer program configured to cause a processor-based device to execute a method for operating a document management device having a document storage unit for storing a document, the method comprising the steps of:

receiving a usage permission information request message from a first client, said first client being a usage permission information requesting client, said usage permission information permitting access to the document storage unit;

generating the usage permission information in response to the received usage permission information request message from the first client;

transmitting the usage permission information to the first client; and receiving an access permission request from a second client, the second client being a usage requesting client, the access permission request including usage permission information, the usage permission information is used to permit access to the document storage unit by the second client and is used to allow the second client to transfer a document stored in the second client directly to the document storage unit.

* * * * *